US012792183B2

(12) United States Patent
Liu et al.

(10) Patent No.: US 12,792,183 B2
(45) Date of Patent: Nov. 10, 2026

(54) TOUCH DISPLAY MODULE, TOUCH DISPLAY APPARATUS AND ELECTRONIC DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jianghua Liu, Beijing (CN); Jun Yan, Beijing (CN); Jaeseung Kim, Beijing (CN); Benlian Wang, Beijing (CN); Zhiqiang Wang, Beijing (CN); Guiyu Zhang, Beijing (CN); Ping Luo, Beijing (CN); Shuai Liu, Beijing (CN); Jianjun Liu, Beijing (CN); Liqing Jiang, Beijing (CN); Hai Zheng, Beijing (CN)

(73) Assignees: CHENGDU BOE OPTOELECTRONICS TECHNOLOGY CO., LTD., Chengdu (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/995,948

(22) PCT Filed: Apr. 26, 2023

(86) PCT No.: PCT/CN2023/090969

§ 371 (c)(1),
(2) Date: Jan. 17, 2025

(87) PCT Pub. No.: WO2024/221299

PCT Pub. Date: Oct. 31, 2024

(65) Prior Publication Data

US 2026/0050341 A1 Feb. 19, 2026

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/04164* (2019.05);
(Continued)

(58) Field of Classification Search
None
See application file for complete search history.

(56) References Cited

U.S. PATENT DOCUMENTS

2012/0217893 A1* 8/2012 Matsumoto ............ H05B 41/02 315/255
2014/0009428 A1* 1/2014 Coulson ............. G06F 3/04166 345/174
(Continued)

FOREIGN PATENT DOCUMENTS

CN 107610668 A 1/2018
CN 110930927 A 3/2020
(Continued)

OTHER PUBLICATIONS

International Search Report of application No. PCT/CN2023/090969 dated Jan. 4, 2024.
Written Opinion of application No. PCT/CN2023/090969 dated Jan. 4, 2024.

*Primary Examiner* — Nicholas J Lee
(74) *Attorney, Agent, or Firm* — Calfee, Halter & Griswold LLP

(57) ABSTRACT

Disclosed is a touch display module, the touch display module having a display area, and a non-display area that is connected to the display area. The touch display module comprises a first lead and a second lead, the second lead being disposed at a side of the first lead distant from the display area, a second signal is loaded on the second lead,
(Continued)

the second signal having the same frequency as, but the opposite direction to, a first signal loaded on the first lead; the second signal can generate electromagnetic interference radiation opposite to that of the first signal, to weaken electromagnetic interference radiation generated by the first signal, thereby reducing the electromagnetic interference radiation of the touch display module and reducing interference with electronic devices. Also disclosed are a touch display apparatus and an electronic device.

19 Claims, 23 Drawing Sheets

(52) U.S. Cl.
CPC ........ *G06F 3/04166* (2019.05); *G06F 3/0445* (2019.05); *G06F 3/0446* (2019.05); *G06F 2203/04107* (2013.01); *G06F 2203/04111* (2013.01); *G06F 2203/04112* (2013.01)

(56) References Cited

U.S. PATENT DOCUMENTS

| | | | | |
|---|---|---|---|---|
| 2016/0246425 | A1* | 8/2016 | Liu | G06F 3/0412 |
| 2017/0154704 | A1* | 6/2017 | Kanna | C09D 133/08 |
| 2020/0073514 | A1* | 3/2020 | Kuo | G06F 3/0412 |
| 2020/0081568 | A1* | 3/2020 | Xu | G06F 3/047 |
| 2020/0133415 | A1* | 4/2020 | Choi | G06F 3/0412 |
| 2020/0167038 | A1* | 5/2020 | Lee | G06F 3/0443 |
| 2022/0171498 | A1* | 6/2022 | Oh | G06F 3/04164 |

FOREIGN PATENT DOCUMENTS

| | | | |
|---|---|---|---|
| CN | 109375826 | B | 5/2020 |
| CN | 113515205 | A | 10/2021 |
| CN | 215680696 | U | 1/2022 |
| CN | 115917486 | A | 4/2023 |

* cited by examiner

TOUCH DISPLAY MODULE, TOUCH DISPLAY APPARATUS AND ELECTRONIC DEVICE

CROSS REFERENCE TO RELATED APPLICATION

This application is a National Stage application of PCT/CN2023/090969, filed on Apr. 26, 2023, which is incorporated herein by reference in their entirety.

TECHNICAL FIELD

The present disclosure relates to the field of display technology, and specifically to a touch display module, a touch display apparatus, and an electronic device.

BACKGROUND

At present, touch control is predominantly implemented through external attachments. However, this type of touch control is more expensive compared to flexible multi-layer structures (FMLOC), and requires introduction of flexible multi-layer structures to reduce touch control costs.

Electronic devices with the flexible multi-layer structures will emit significant electromagnetic radiation when the touch drive signal of the touch screen is strong, which will interfere with the electronic devices.

It should be noted that the information disclosed in the background section above is intended solely to enhance the understanding of the present disclosure. As such, it may include information that does not constitute prior art known to those skilled in the art.

SUMMARY

An objective of the present disclosure is to overcome shortcomings of the prior art and provide a touch display module, a touch display apparatus, and an electronic device.

According to one aspect of the present disclosure, there is provided a touch display module having a display area and a non-display area connected to the display area, wherein the touch display module includes: a base substrate; a first lead provided on a side of the base substrate and located in a non-display area, and being configured to input a first signal; a second lead, the orthographic projection of the second lead on the base substrate is on a side of the orthographic projection of the first lead on the base substrate away from the display area, the second lead being configured to input a second signal, the second signal having a same frequency and being in an opposite direction with the first signal.

In an embodiment of the present disclosure, during a non-touch driving period, the second lead inputs a reference signal.

In an embodiment of the present disclosure, the second lead is provided adjacent to the first lead, and the second lead is parallel to the first lead.

In an embodiment of the present disclosure, the touch display module further includes a first grounding line, an orthographic projection of the first grounding line on the base substrate is between the orthographic projection of the second lead on the base substrate and the orthographic projection of the first lead on the base substrate, and the first grounding line is configured to input a reference signal.

In an embodiment of the present disclosure, a dam away from the display area is provided in the non-display area, and the second lead is located on a side of the dam away from the display area or on a side of the dam close to the display area.

In an embodiment of the present disclosure, the second lead includes a signal segment and a binding segment connected in sequence, the signal segment is parallel to the dam, the binding segment is perpendicular to the dam, and a width of the signal segment is greater than a width of the binding segment.

In an embodiment of the present disclosure, a ratio of the width of the signal segment to the width of the binding segment is 1-10.

In an embodiment of the present disclosure, a number of second leads is plural, and the touch display module further includes a adapter line, and the adapter line is connected to a plurality of first leads through via holes, respectively.

In an embodiment of the present disclosure, the touch display module further includes a haptic control layer, the haptic control layer includes a first sub-haptic control layer and a second sub-haptic control layer, the first sub-haptic control layer and the second sub-haptic control layer are insulated from each other, and the second lead is provided on the same layer as at least one of the first sub-haptic control layer and the second sub-haptic control layer.

In an embodiment of the present disclosure, the signal segment includes a first sub-signal segment and second sub-signal segments at both ends of the first sub-signal segment, the first sub-signal segment is at the first sub-haptic control layer, the second sub-signal segment is located in the second sub-haptic control layer, and the second sub-signal segment is connected to the first sub-signal segment through a via hole.

In an embodiment of the present disclosure, a width of the second lead is 30 μm-200 μm.

In an embodiment of the present disclosure, the signal segment is disconnected at an edge or a corner of the non-display area.

In an embodiment of the present disclosure, the non-display area further includes a binding area, the binding area is provided with a binding pin, and the first lead and the second lead are bound to the binding pin.

In an embodiment of the present disclosure, the touch display module further includes a signal amplification module, an input end of the signal amplification module is configured to input a second signal, and the output end of the signal amplification module is connected to the first lead.

In an embodiment of the present disclosure, the amplification module is a voltage amplification module or a current amplification module.

In an embodiment of the present disclosure, the touch display module further includes a second grounding line, and an orthographic projection of the second grounding line on the base substrate is on the side of the orthographic projection of the second lead on the base substrate away from the display area.

In an embodiment of the present disclosure, the first sub-haptic control layer includes a first touch electrode and a second touch electrode, the first lead includes a touch driving lead and/or a touch sensing lead, and the first touch electrode and the second touch electrode are connected to the touch driving lead and the touch sensing lead, respectively.

According to another aspect of the present disclosure, there is provided a touch display module, applied to an in-vehicle display apparatus, comprising: a base substrate; a first lead provided on a side of the base substrate and located in a non-display area, and being configured to input a first signal; a second lead, an orthographic projection of the second lead on the base substrate being on a side of an orthographic projection of the first lead on the base substrate away from the display area, the second lead being configured to input a second signal, the second signal having a same frequency and being in an opposite direction with the first signal; a haptic control layer comprising a plurality of touch units, each of the touch units comprising sub-touch units arranged in an array, each of the sub-touch units comprising a first touch electrode portion and a second touch electrode portion, wherein one of the first touch electrode portion and the second touch electrode portion is interconnected, and the other of the first touch electrode portion and the second touch electrode portion is connected through a bridging layer, and a plurality of first touch electrode portions on a same straight line form a first touch electrode, a plurality of second touch electrode portions on a same straight line form a second touch electrode, the first touch electrode and the second touch electrode are connected to one first lead, respectively.

In an embodiment of the present disclosure, each of the first touch electrode portions is provided with a first main body portion, and the second touch electrode portion is provided with a second main body portion, an orthographic projection of the first main body portion on the base substrate forms an overlapping position with an orthographic projection of the second main body portion on the base substrate, and the overlapping position is at a center of the sub-touch unit.

In an embodiment of the present disclosure, the first touch electrode portion and the second touch electrode portion are coordinated through an interdigitated structure.

In an embodiment of the present disclosure, the interdigitated structure includes a first interdigitated portion provided on the first touch electrode portion and a second interdigitated portion provided on the second touch electrode portion, the first interdigitated portion and the second interdigitated portion are insulated on the same layer and nested with each other.

In an embodiment of the present disclosure, the first touch electrode portion and the second touch electrode portion have grid-shaped electrode lines, the touch display module includes a plurality of sub-pixels, and the electrode lines of the first touch electrode portion and the second touch electrode portion are provided between adjacent sub-pixels.

In an embodiment of the present disclosure, the electrode lines of the first touch electrode portion and the second touch electrode portion are at a same distance from the adjacent sub-pixels.

According to a further aspect of the present disclosure, there is provided a touch display apparatus comprising the touch display module provided by another aspect of the present disclosure.

According to a further aspect of the present disclosure, there is provided an electronic device comprising the touch display apparatus provided by another aspect of the present disclosure.

It should be understood that the above general description and the subsequent detailed description are only exemplary and explanatory, and cannot limit the present disclosure.

BRIEF DESCRIPTION OF THE DRAWINGS

The accompanying drawings, which are incorporated in and constitute part of this specification, illustrate embodiments consistent with the invention and, together with the description, serve to explain the principles of the invention. Apparently, the drawings in the following description are only for illustrating some embodiments of the present disclosure and those of ordinary skill in the art can also derive other drawings based on the drawings without paying any creative labor.

LIST OF REFERENCE NUMBERS

Figure 1:
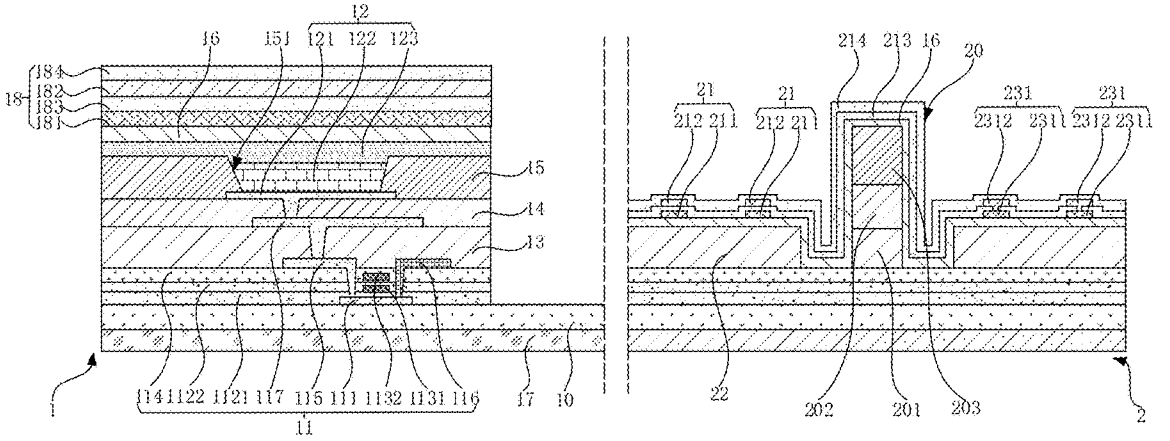
FIG. 1 is a cross-sectional schematic view of a touch display module according to an embodiment of the present disclosure.

1—display area, 10—base substrate, 11—thin film transistor, 111—active layer, 1121—first gate insulating layer, 1122—second gate insulating layer, 113—gate electrode, 1131—first gate electrode, 1132—second gate electrode, 114—interlayer dielectric layer, 115—first source electrode, 116—drain electrode, 117—second source electrode, 12—light-emitting layer, 121—first electrode, 122—light-emitting element, 123—second electrode, 13—first planarization layer, 14—second planarization layer, 15—pixel defining layer, 151—pixel opening, 16—encapsulation layer, 17—buffer layer, 18—haptic control layer, 181—first sub-haptic control layer, 182—second sub-haptic control layer, 183—first insulation layer, 184—second insulation layer, 185—sub-touch unit, 1851—first touch electrode portion, 1852—second touch electrode portion, 1853—first main body portion, 1854—first connecting portion, 1855—first interdigitated portion, 1856—second main body portion, 1857—second connecting portion, 1858—second interdigitated portion, 1859—second cooperation portion, 186—transition area, 2—non-display area, 20—dam, 201—first filling layer, 202—second filling layer, 203—third filling layer, 21—first lead, 211—first sub-lead, 212—second sub-lead, 213—third insulation layer, 214—forth insulation layer, 22—third planarization layer, 23—second lead, 231—signal segment, 2311—first sub-signal segment, 2312—second sub-signal segment, 232—binding segment, 233—second sub-lead segment, 241—first grounding line, 242—second grounding line, 25—adapter line, 251—main line segment, 252—branch line segment, 26—binding pin, 3—signal amplification module, 4—touch drive chip, 5—controller

DETAILED DESCRIPTION

Now, the exemplary embodiments will be described more fully with reference to the accompanying drawings. However, the exemplary embodiments can be embodied in a variety of forms and should not be construed as limiting the embodiments set forth herein. Instead, these embodiments are provided so that the present disclosure will be thorough and complete, and the concepts of the exemplary embodiments will be fully given to those skilled in the art. In addition, the drawings are merely schematic illustrations of the present disclosure, and are not necessarily drawn to scale. In addition, the drawings are merely schematic illustrations of the present disclosure, and are not necessarily drawn to scale.

Although relative terms such as "above" and "under" are used herein to describe the relationship of one component relative to another component, such terms are used herein only for the sake of convenience, for example, in the direction shown in the figure, it should be understood that if the referenced device is inversed upside down, a component described as "above" will become a component described as "under". When a structure is described as "above" another structure, it probably means that the structure is integrally formed on another structure, or, the structure is "directly" disposed on another structure, or, the structure is "indirectly" disposed on another structure through a further structure.

Words such as "one," "an/a" and "said" are used herein to indicate the presence of one or more elements/components/etc. Terms "include" and "have" are used to indicate an inclusive meaning and refer to the possibility of the existence of additional elements/components/etc. in addition to those as listed. Terms "first," "second" and "third" are used herein only as markers but not limit the number of objects.

Electronic device relates to various types of signal reception, such as analog signals, 4G signals, 5G signals, WIFI signals, etc. In order to prevent harmful interference to vehicle receivers, electromagnetic radiation limits are set for the electronic device. The electronic device using touch screen technology typically uses touch drive chips driven by square waves, trapezoidal waves, or sine waves. The harmonic components of the rising and falling edges of the touch drive signal waveform may form interference harmonics, which radiate electromagnetic interference (EMI) outward. For the touch drive signals with square waves and trapezoidal waves, which contain a significant amount of harmonic components, the above situation is particularly significant.

The existing touch structure mainly relies on external devices, but compared to flexible multi-layer structures (FMLOC), this touch structure is more expensive and requires the introduction of flexible multi-layer structures to reduce touch costs. In addition, FMLOC technology may also be applied to curved display terminals. The higher the voltage of the touch drive signal is, the more frequency types of the touch drive signal are, and the larger the size of the touch screen is, the stronger the electromagnetic radiation of the touch drive signal to the outside is. The stronger electromagnetic radiation can interfere with the in-vehicle electronic devices.

In the art of vehicle industry, in order to prevent harmful electromagnetic radiation from interfering with vehicle electronic devices, electromagnetic interference radiation limits have been set for in-vehicle electronic device. In the art of new displays, OLED display modules have begun to be applied in-vehicle displays and have gradually adopted FMLOC touch structures. Compared to traditional external touch structures, for vehicle OLED display modules using FMLOC touch structures, their resistance and capacitance loads (RC loading) are large, and the display noise is also high.

In order to achieve better touch signal-to-noise ratio and touch performance, the vehicle OLED display module using FMLOC touch structure has a high voltage of the touch driving signal of the touch driving electrode. The increase in voltage of the touch drive signal can enhance electromagnetic interference radiation, which can exceed the electromagnetic radiation limit of in-vehicle electronic devices. The issue of electromagnetic interference radiation has become one of the main technical bottlenecks for the FMLOC touch structure of the vehicle OLED display modules.

Based on this, an embodiment of the present disclosure provides a touch display module. As shown in FIGS. 1 to 23, the touch display module has a display area 1 and a non-display area 2 connected to the display area. The touch display module includes a base substrate 10, a first lead 21, and a second lead 23. The first lead 21 is provided on a side of the base substrate and located in a non-display area, and is configured to input a first signal; an orthographic projection of the second lead 23 on the base substrate is on a side of an orthographic projection of the first lead 21 on the base substrate away from the display area. The second lead 23 is configured to input a second signal, the second signal having a same frequency and being in an opposite direction with the first signal.

The second lead 23 is provided on the side of the first lead 21 away from the display area 1. The second signal is loaded on the second lead 23, the second signal having a same frequency and being in an opposite direction with the first signal loaded on the first lead 21. The second signal may generate electromagnetic interference radiation in the opposite direction to the first signal, to weaken the electromagnetic interference radiation generated by the first signal and reducing the electromagnetic interference radiation of the entire touch display module, so as to reduce interference with electronic devices.

The touch display module involved in the embodiments of this disclosure will be described in detail below.

Figure 2:
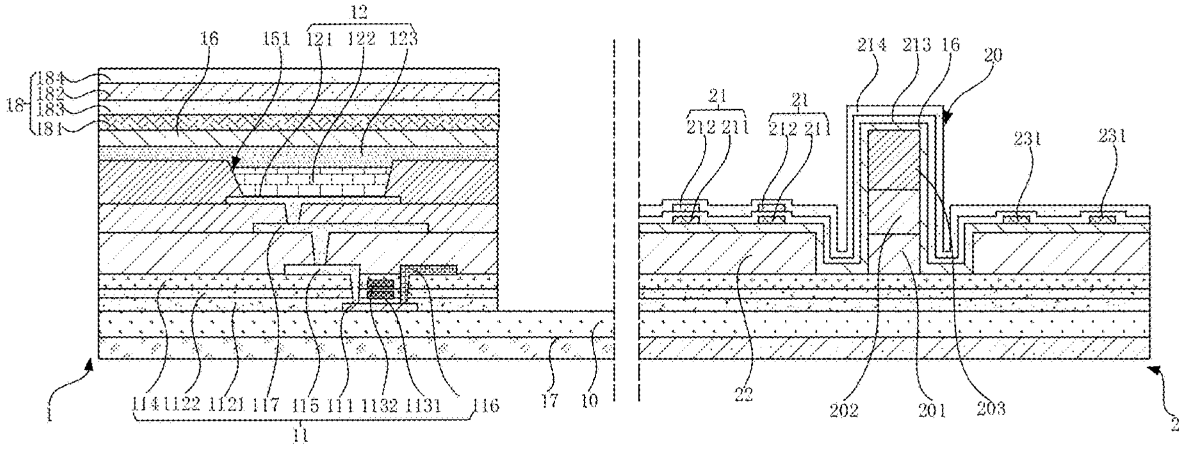
FIG. 2 is a cross-sectional schematic view of another touch display module according to an embodiment of the present disclosure.

As shown in FIGS. 1 and 2, the touch display module has a display area. The display area 1 is equipped with a display layer group, which includes a driving circuit layer and a light-emitting layer 12. The driving circuit layer is provided on the side of the base substrate 11, and the light-emitting layer 12 is provided on a side of the driving circuit layer away from the base substrate 10. The display layer group further includes a first planarization layer group, which includes a first planarization layer 13. The first planarization layer 13 is provided between the array substrate and the light-emitting layer 12, and a second planarization layer 14 may be provided on a side of the first planarization layer 13 away from the base substrate 10.

The display layer group is provided on the base substrate 10 and may be directly stacked on a surface of the base substrate 10; alternatively, a buffer layer 17 may be provided on the surface of the base substrate 10, and the display layer group may be stacked on a surface of the buffer layer 17 away from the base substrate 10. The buffer layer 17 is made of an insulating material.

The driving circuit layer may include a plurality of thin film transistors, the thin film transistor may be a top gate or a bottom gate. Taking the top gate thin film transistor as an example, the thin film transistor may include an active layer 111, a gate electrode 113, a second gate electrode 1132, a first gate insulating layer 1121, a second gate insulating layer 1122, and a source-drain electrode.

The active layer 111 is provided on the side of the base substrate 10, and the material of the active layer 111 may be amorphous silicon semiconductor material, low-temperature polycrystalline silicon semiconductor material, metal oxide semiconductor material, organic semiconductor material, or other types of semiconductor materials. Therefore, the thin film transistor may be an N-type thin film transistor or a P-type thin film transistor. The active layer 131 may include a channel region and two different doping types of doping regions arranged on both sides of the channel region.

The first gate insulation layer 1121 is provided on a side of the active layer 111 away from the base substrate, the first gate insulation layer 1121 may cover the active layer 111 and the base substrate 10. The first gate electrode 1131 is provided on a side of the first gate insulation layer 1121 away from the base substrate 10, facing the active layer 111. That is, a projection of the first gate electrode 1131 on the base substrate 10 is within a projection of the active layer 111 on the base substrate 10. For example, the projection of the first gate electrode 1131 on the base substrate 10 coincides with a projection of the channel region of the active layer 111 on the base substrate 10. The second gate insulation layer 1122 is provided on the side of the first gate electrode 1131 away from the base substrate. The second gate insulation layer 1122 may cover both the first gate electrode 1131 and the first gate insulation layer 1121. The second gate electrode 1132 is provided on a side of the second gate insulation layer 1122 away from the base substrate 10, facing the active layer 111. The materials of the first gate insulation layer 1121 and the second gate insulation layer 1122 are an insulating material such as silicon oxide.

The thin film transistor may further include an interlayer dielectric layer 114, the interlayer dielectric layer 114 is provided on the side of the second gate electrode 1132 away from the base substrate. The interlayer dielectric layer 114 may cover the second gate electrode 1132 and the second gate insulating layer 1122, the interlayer dielectric layer 114 is made of an insulating material. The source-drain electrode is located on the surface of the interlayer dielectric layer 114 away from the base substrate 10, and the source-drain electrode includes a first source electrode 115 and a drain electrode 116. The first source electrode 115 and the drain electrode 116 are connected to the active layer 111, for example, the first source electrode 115 and the drain electrode 116 are respectively connected to the two doping regions of the corresponding active layer 111 through via holes.

The first planarization layer 13 is provided on a side of the source-drain electrode away from the base substrate 10, and a surface of the first planarization layer 13 away from the base substrate 10 is a plane. The source-drain electrode may further include a second source electrode 117, the second source electrode 117 is connected to the first source electrode 115. The second planarization layer 14 is provided on a side of the second source electrode 117 away from the base substrate 10, and the second planarization layer 14 covers the second source electrode 117 and the first planarization layer 13. A protective layer may further be provided on a side of the first source electrode 115 away from the base substrate 10, the protective layer covers the first source electrode 115 and the drain electrode 116. The first planarization layer 13 covers the protective layer.

The light-emitting layer is provided on the side of the first planarization layer 13 or the second planarization layer 14 away from an array substrate. The light-emitting layer may include a pixel defining layer 15 and a plurality of light-emitting units. The pixel defining layer 15 has a plurality of pixel openings 151, and the a plurality of light-emitting units are respectively arranged within different pixel openings 151. Each light-emitting unit may include a first electrode 121, a light-emitting element 122, and a second electrode 123. The first electrode 121 is provided on the surface of the first planarization layer 13 or the second planarization layer 14 away from the base substrate 10, the light-emitting element 122 is provided on a surface of the first electrode 121 away from the base substrate 10, and the second electrode 123 is provided on a surface of the light-emitting element 122 away from the base substrate 10. The light-emitting layer 12 may be driven to emit light through the first electrode 121 and the second electrode 123 to display images.

The first electrode 121 is connected to the first source electrode 115 or the second source electrode 117. The pixel defining layer 15 is provided on a side of the first electrode 121 away from the base substrate 10. When the thin film transistor only includes the first source electrode 115, the first electrode 121 is connected to the first source electrode 115, and the pixel defining layer 15 covers the first electrode 121 and the first planarization layer 13. When the thin film transistor further includes the second source electrode 117, the first electrode 121 is connected to the second source electrode 117, and the pixel defining layer 15 covers the first electrode 121 and the second planarization layer 14.

The second electrode 123 may serve as a cathode, and the first electrode 121 may serve as an anode. The light-emitting element 122 may be driven to emit light by applying a signal to the first electrode 121. The specific principle of light emission will not be described in detail herein. The light-emitting element 122 may include electroluminescent organic light-emitting materials and may be formed by processes such as evaporation. For example, the light-emitting element 122 may include a hole injection layer, a hole transport layer, a light generation layer, an electron transport layer, and an electron injection layer sequentially stacked on a layer of the first electrode 121. It should be noted that the light-emitting element 122 may include red, green, and blue light-emitting elements depending on the color of the light emitted.

In addition, the display panel of the present disclosure may also include an encapsulation layer 16, the encapsulation layer 16 may be provided on the light-emitting unit; the encapsulation layer 16 is provided on a side of the light-emitting layer 12 away from the base substrate 10, to encapsulate the light-emitting layer and prevent water and oxygen erosion. The encapsulation layer 16 may be a single-layer or multi-layer structure, and its material may include organic or inorganic materials, which are not specifically limited herein.

In this embodiment, the encapsulation layer 16 may include a first inorganic encapsulation layer, an organic encapsulation layer, and a second inorganic encapsulation layer. The first inorganic encapsulation layer is provided on the side of the light-emitting layer 12 away from the base substrate 10, the organic encapsulation layer is provided on a side of the first inorganic encapsulation layer away from the base substrate 10, and the second inorganic encapsulation layer is provided on a side of the organic encapsulation layer away from the base substrate 10.

The display area 1 further includes a haptic control layer 18, the haptic control layer 18 may be mutual capacitance haptic control. The haptic control layer 18 includes a first sub-haptic control layer 181 and a second sub-haptic control layer 182. The first sub-haptic control layer 181 is a metal mesh layer (MM), and the second sub-haptic control layer 182 is a bridge metal layer (BM). A first insulation layer 183 is provided on a side of the first sub-haptic control layer 181 away from the base substrate 10, and a second insulation layer 184 is provided on a side of the second sub-haptic control layer 182 away from the base substrate 10. The protective layer 19 may also be provided on a side of the second insulation layer 184 away from the base substrate 10.

Due to the flow of liquid organic packaging materials, it is easy for them to overflow. In order to prevent the overflow of organic packaging materials, especially at the lower border position, a dam 20 may be provided in the non-display area away from the display area, which serves as a barrier. The cross-sectional shape of the dam 20 may be rectangular or trapezoidal as shown in the figures, and the dam 20 has at least one inclined side close to the display area, which is not limited herein.

The dam 20 is provided around the display area 1, and a stacked pattern of the dam 20 includes at least one filling layer, the filling layer is provided on the same layer and material as one or more of the first planarization layer 13, the second planarization layer 14, and the pixel defining layer 15. In this embodiment, the stacked pattern of the dam 20 may include a first filling layer 201, the first filling layer 201 is provided on the same layer and material as the first planarization layer 13. A second filling layer 202 may further be provided on the first filling layer 201, and the second filling layer 202 may be provided on the same layer and material as the second planarization layer 14. A third filling layer 203 may further be provided on the second filling layer 202, and the third filling layer 203 may be provided on the same layer and material as the pixel defining layer 15. The encapsulation layer 16, the first insulation layer 183, and the second insulation layer 184 are sequentially provided on a side of the dam 20 away from the base substrate 10.

A first lead may be provided on the non-display area 102 between the dam 20 and the display area, and on the side of the encapsulation layer 16 away from the base substrate 11. An orthographic projection of the second lead 23 on the base substrate is on a side of the orthographic projection of the first lead 21 on the base substrate away from the display area. If the second lead 23 is provided on the side of the first lead close to the display area, touch and display may be affected. The first lead 21 is configured to input the first signal, and the second lead 23 is configured to input the second signal.

The first lead 21 may be a touch signal line, the touch signal line may include: a first sub-lead 211 arranged on the same layer as the metal grid layer MM, and a second sub-lead 212 arranged on the same layer as the bridge metal layer BM and electrically connected to the first sub-lead 211. A third insulation layer 213 is provided between the second sub-lead 212 and the first sub-lead 211, and the third insulation layer 213 is provided on the same layer and material as the first insulation layer. A fourth insulation layer 214 is provided on the side of the second sub-lead 212 away from the base substrate, and the fourth insulation layer 214 is provided on the same layer and material as the second insulation layer.

By setting the touch signal line 185 as a double-layer wiring including the first sub-lead 211 and the second sub-lead 212, it is possible to load touch signals to a metal mesh layer MM through another layer of wiring even if one layer of wiring is partially broken, to effectively solve the problem of touch failure caused by the breakage of the single-layer wiring; in addition, compared to the design of single-layer wiring, the double-layer wiring can also reduce the resistance value of the touch signal line 185. In specific implementation, the first sub-lead 211 and the second sub-lead 212 are electrically connected through a via hole that penetrates the inorganic insulation layer.

The second lead 23 may be provided on the same layer as at least one of the first sub-haptic control layer and the second sub-haptic control layer. The second lead 23 is provided on the same layer as the first sub-haptic control layer, and certainly, the second lead 23 may also be provided on the same layer as the second sub-haptic control layer.

Figure 3:
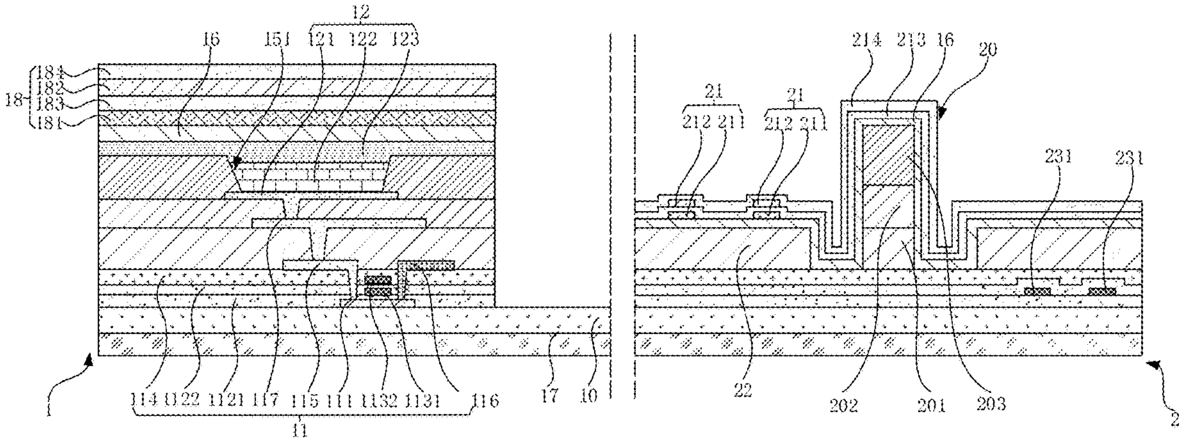
FIG. 3 is a cross-sectional schematic view of another touch display module according to an embodiment of the present disclosure.
Figure 4:
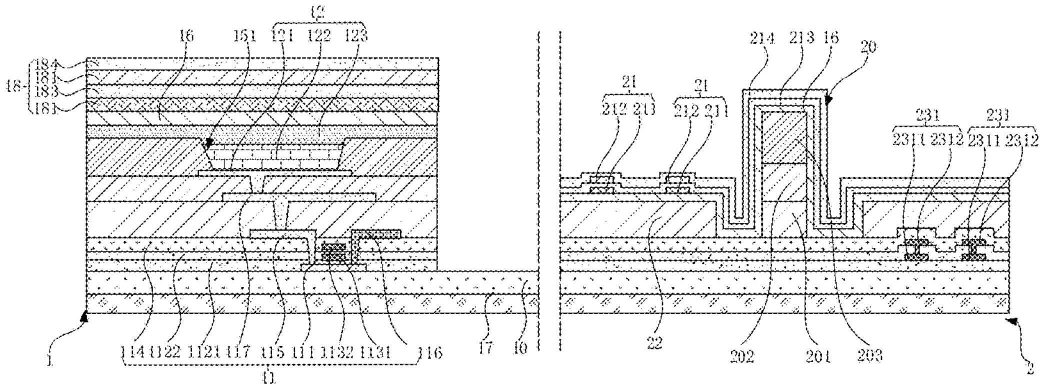
FIG. 4 is a cross-sectional schematic view of another touch display module according to an embodiment of the present disclosure.

As shown in FIGS. 3 and 4, the second lead 23 may further be provided on the same layer and material as the gate electrode. The touch display module includes a first gate electrode 1131 and a second gate electrode 1132. A first sub-signal segment 2311 may be provided on the same layer and material as the first gate electrode 1131, and a second sub-signal segment 2312 may be provided on the same layer and material as the second gate electrode 1132. The second sub-signal segment 2312 is connected to the first sub-signal segment 2311 through a via hole.

Since gate lines and data lines (not shown) are usually provided on a side of the non-display area close to or away from the display area, the gate lines are provided on the same layer and material as the first gate electrode 1131 or the second gate electrode 1132, and the data lines are usually provided on the same layer and material as the first source electrode 115 and the drain electrode 116. Both the gate lines and the data lines are provided on a side of the haptic control layer close to the base substrate. Therefore, the non-display area 2 is further provided with a second planarization layer group that is provided on the side of the interlayer dielectric layer 114 away from the base substrate. The second planarization layer group flattens the side of the gate line and the data line away from the base substrate 10, allowing the first lead 21 to be evenly arranged on a flat surface and avoiding short circuits between a plurality of first leads 21.

The second planarization layer group may include a third planarization layer 22, the third planarization layer 22 is provided on the same layer and material as the interlayer dielectric layer 114. The second planarization layer group may further include a fourth planarization layer, the fourth planarization layer may be provided on the same layer and material as the second planarization layer 14 (not shown). The second planarization layer group may further include a fifth planarization layer (not shown), the fifth planarization layer may be provided on the same layer and material as the pixel defining layer.

The encapsulation layer 16 and the third insulation layer 213 may be provided on the side of the second planarization layer group away from the base substrate 10. Specifically, the third insulation layer 213 may be provided on the side of the encapsulation layer 16 away from the base substrate 10, and the encapsulation layer 16 may be provided on the side of the third planarization layer 22 away from the base substrate. The non-display area 2 may be provided with a fourth insulation layer 214 on the side of the second sub-touch lead and the second sub-signal segment 2312 away from the base substrate 10. The first lead 21 and the second lead 23 are insulated by the third insulation layer 213 and the fourth insulation layer 214, respectively.

In addition, the non-display area 2 also includes the buffer layer 17. It should be understood that other essential components of the display substrate should be understood by those skilled in the art, and should not be repeated here, nor should be used as a limitation to the present disclosure.

Figure 5:
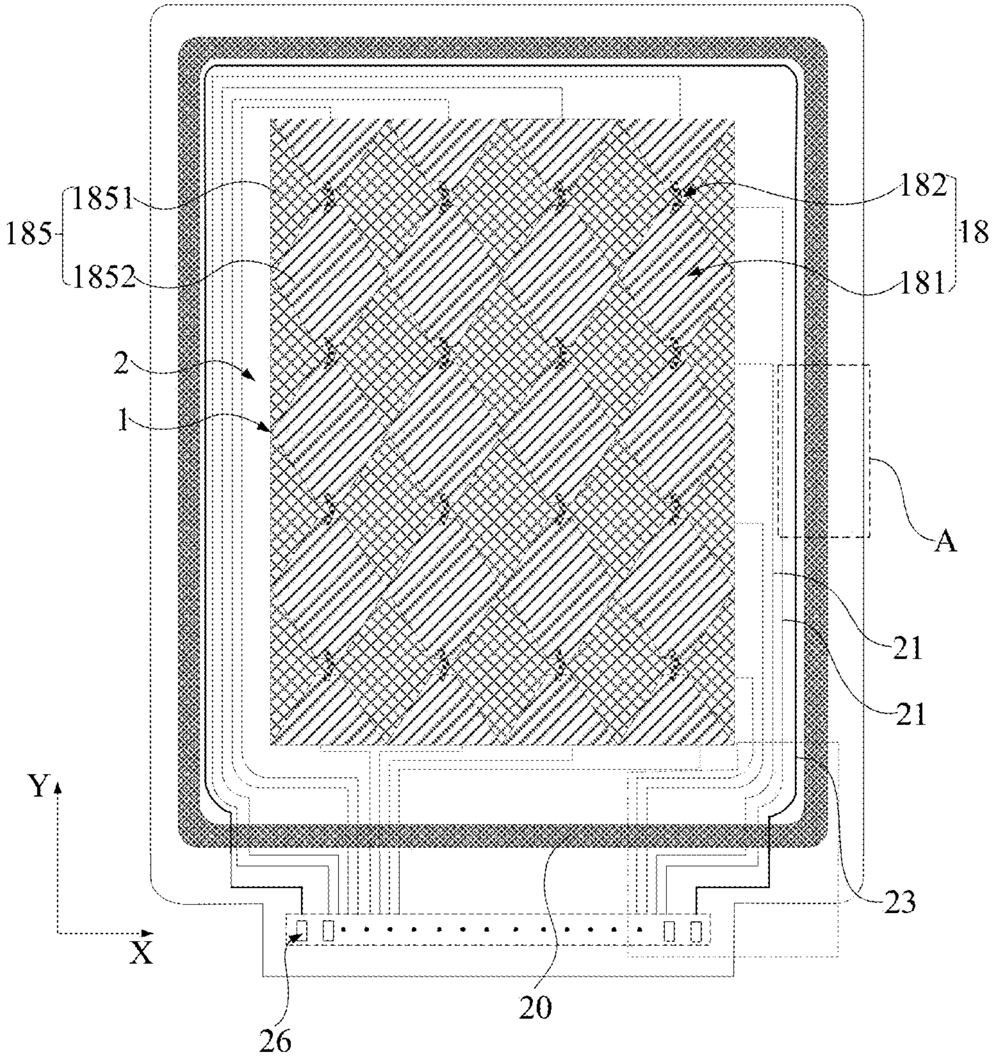
FIG. 5 is a plan schematic view of the touch display module according to an embodiment of the present disclosure when a second lead is provided inside a dam.
Figure 6:
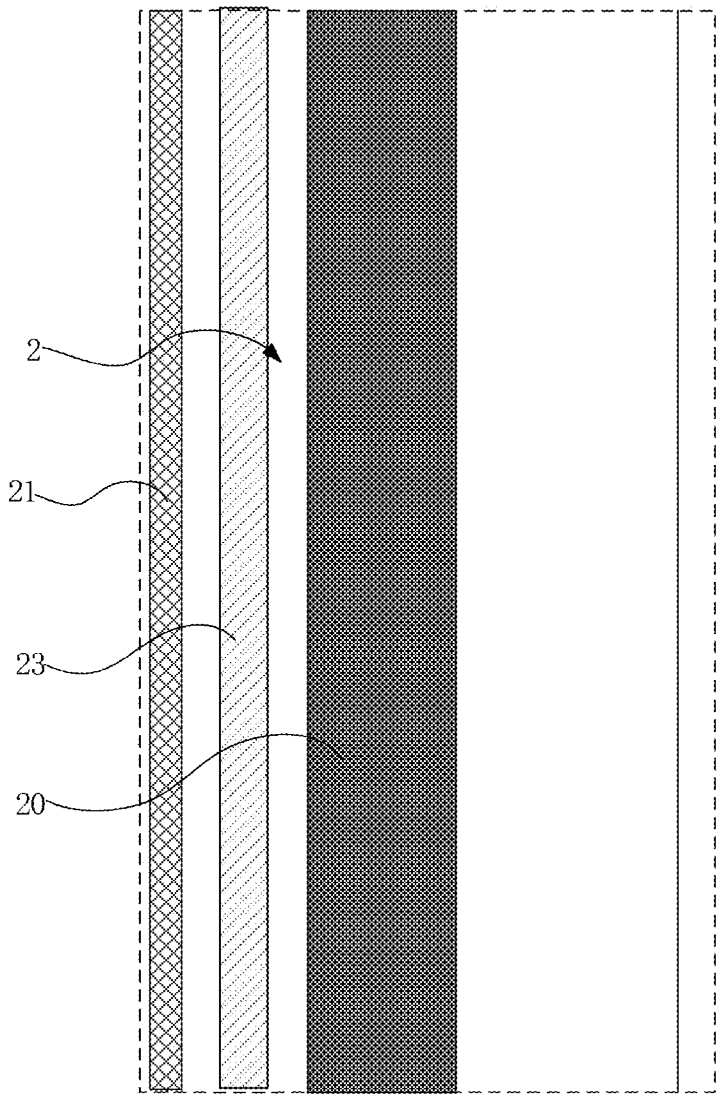
FIG. 6 is an enlarged partial view of part A in FIG. 5.

As shown in FIGS. 5 and 6, the first sub-haptic control layer 181 is described as the metal mesh layer (MM), and the second sub-haptic control layer 182 is described as a bridge metal layer (BM). The first sub-haptic control layer 181 is provided in the display area 101 and may be divided into a first touch electrode and a second touch electrode according to horizontal and vertical directions. The first touch electrode is provided along a first direction, and the second touch electrode is provided along a second direction. The first direction is provided in a Y-direction in FIG. 5, and the Y-direction is perpendicular to a X-direction. The first touch electrode is a touch driving (Tx) metal grid, and the second touch electrode is a touch sensing (Rx) metal grid. One of the first and second touch electrodes is interconnected, and the other thereof is connected through the second sub-haptic control layer 182. A plurality of first leads are electrically connected to the first touch electrode and the second touch electrode, respectively.

Figure 7:
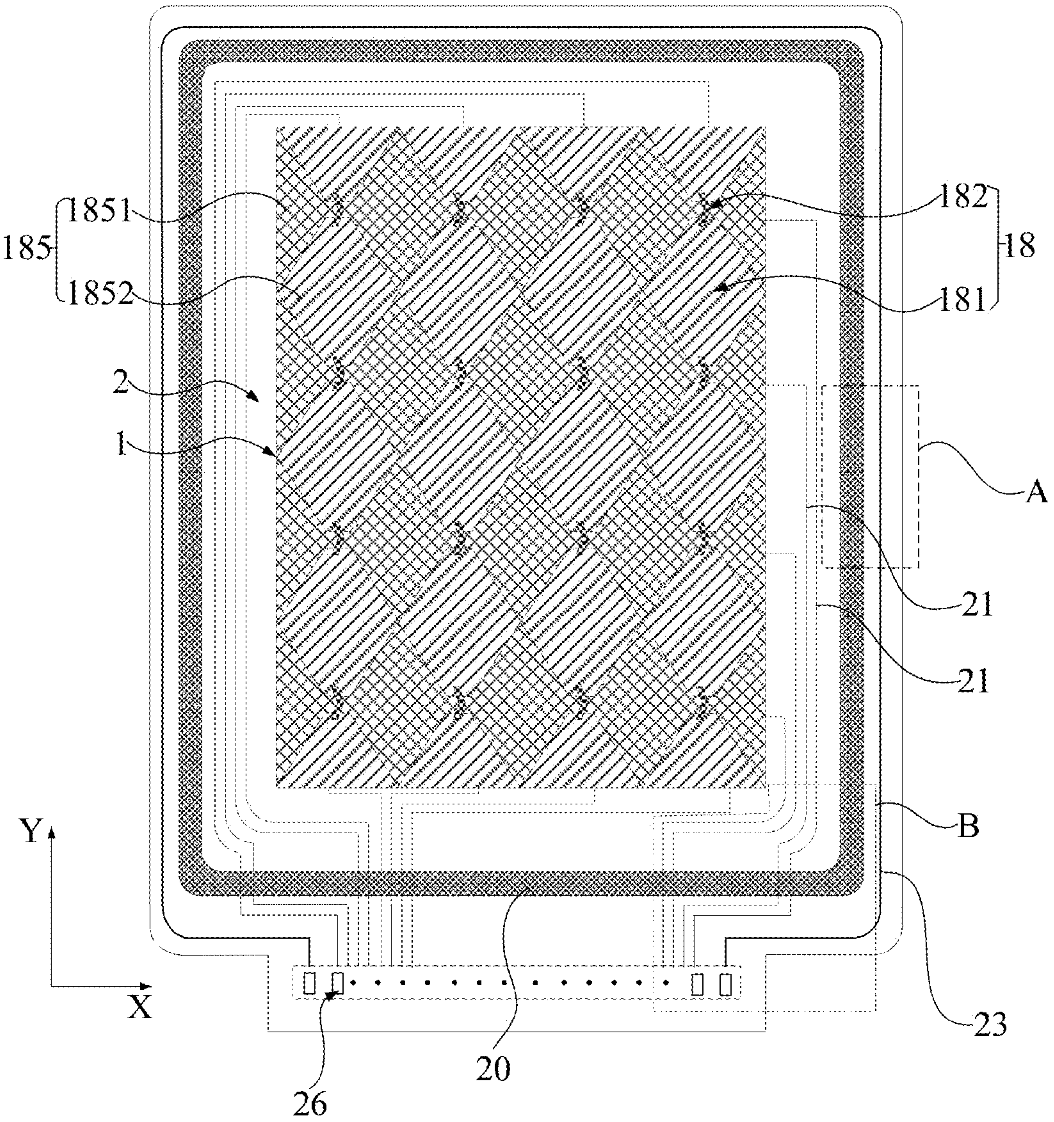
FIG. 7 is a plan schematic view of the touch display module according to an embodiment of the present disclosure when the second lead is provided inside the dam.
Figure 8:
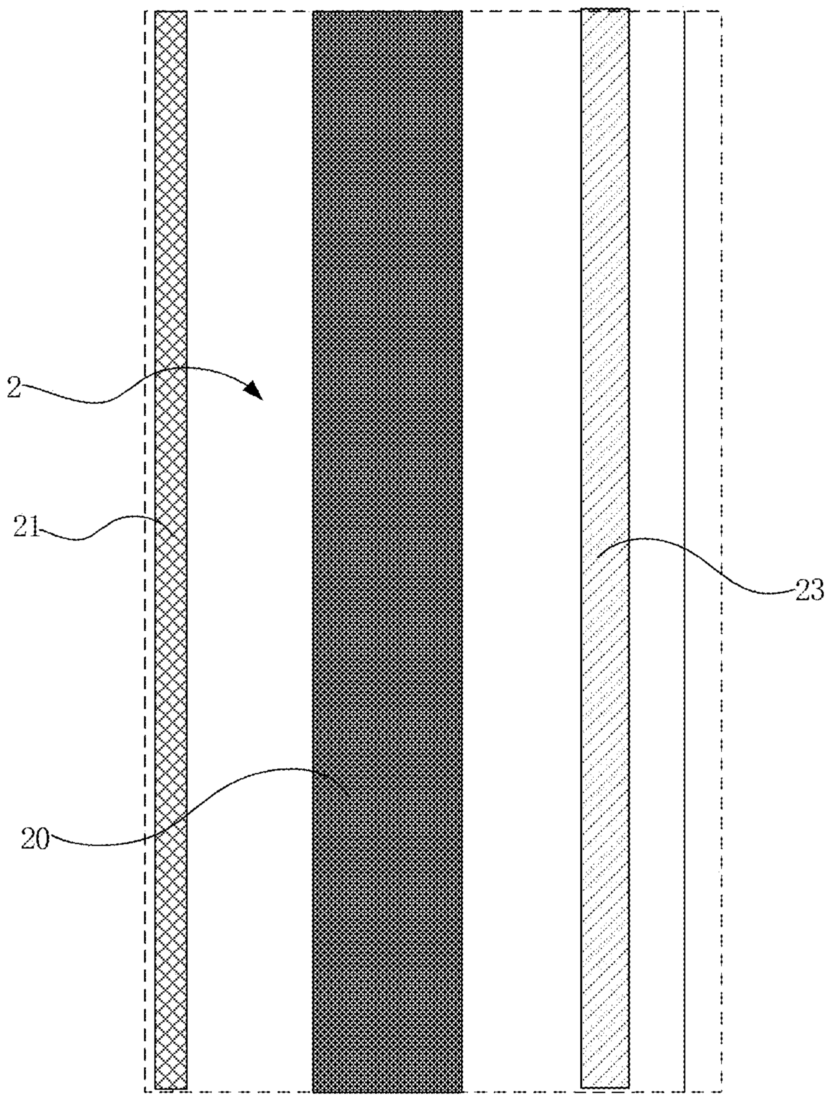
FIG. 8 is an enlarged partial view of part A in FIG. 7.

The first lead 21 may be provided on the side of the dam 20 close to the display area, and the second lead 23 is provided between the dam 20 and the first lead 21. As shown in FIGS. 7 and 8, the first lead 21 may also be provided on the side of the dam 20 away from the display area. The second lead 23 is parallel to the first lead 21, which can ensure that the second signal is completely opposite to the first signal. The second lead 23 may be provided adjacent to the first lead 21, which can significantly weaken the electromagnetic interference radiation generated by the first signal, thereby reducing the electromagnetic interference radiation of the entire touch display module.

Figure 9:
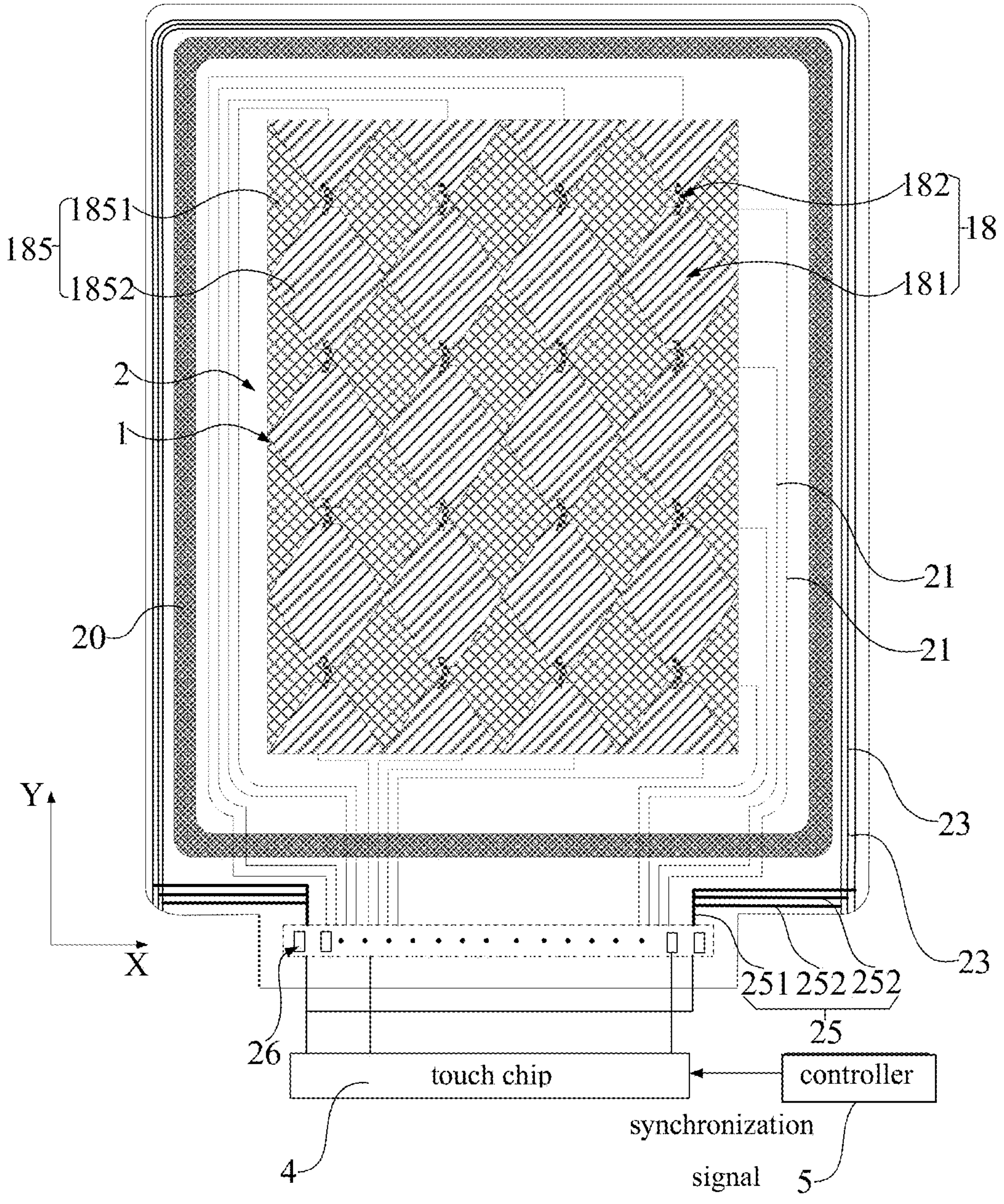
FIG. 9 is a schematic view of a driving device for the touch display module according to an embodiment of the present disclosure.

As shown in FIG. 9, the non-display area further includes a binding area. The first lead 21 and the second lead 23 converge at the binding area of the touch display module, and are connected to the touch drive board through a chip on film (COF) or a flexible film carrier, and finally connected to the binding pin 26 of the touch drive chip 4. The touch drive chip 4 has a plurality of binding pins 26, the binding pins 26 may be divided into touch binding pins and other binding pins. The first lead 21 is bound to the touch binding pin, and the second lead 23 may be bound to an idle touch binding pin, or to other idle binding pins. The signals input to the binding pin of the touch drive chip 4 may be controlled by a controller 5.

Figure 10:
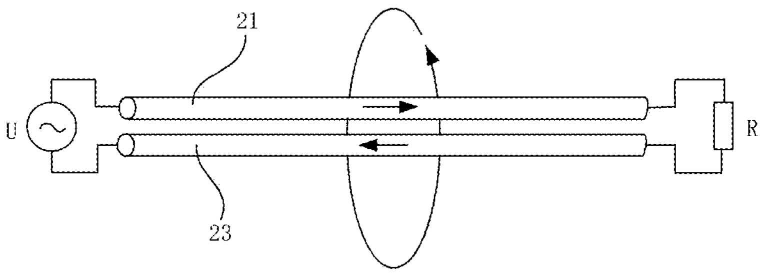
FIG. 10 is a principle schematic view of the touch display module according to an embodiment of the present disclosure.

As shown in FIG. 10, if currents passing through two adjacent wires are equal in magnitude but opposite in direction, the magnetic lines generated by them can cancel each other out. The adjacent wires may be the first lead 21 and the second lead 23, respectively. Electromagnetic simulation are performed on various wiring in the non-display area, including the first lead 21, the first grounding line 241, the second lead 23, etc.; the intensity of electromagnetic interference radiation from the first lead 21 can be simulated and calculated when the first signal is loaded on the first lead 21 under the driving frequency and voltage of the touch drive chip 4; and the intensity of reverse electromagnetic interference radiation from the second lead 23 can be simulated and calculated when the second signal with different amplitudes and opposite phases is applied to the second lead 23.

The second lead 23 is required to counteract and weaken the electromagnetic interference radiation in the corresponding area of the first lead 21 as much as possible, in order to obtain the optimal voltage amplitude or current intensity of the second signal applied on the second lead 23, and minimize the electromagnetic interference radiation of the entire touch display module. Through the above simulation, the voltage amplitude or current intensity of the second signal may be obtained when the electromagnetic interference radiation of the touch display module is minimized.

The first signal is input through the binding pin 26 connected to the first lead 21, and the second signal is input through the binding pin 26 connected to the second lead 23. The second signal having a same frequency and being in an opposite direction with the first signal. As shown in FIG. 4, the voltage amplitude of the second signal may be provided and adjusted through the touch drive chip 4, and the current or voltage of the second signal is the optimal voltage amplitude or current intensity obtained from simulation. The radiation magnetic lines generated by the second signal are opposite to those generated by the first signal, weakening the touch electromagnetic interference radiation of the touch structure of the touch display apparatus.

Figure 11:
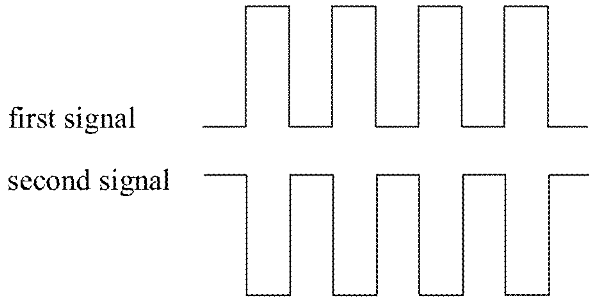
FIG. 11 is a waveform view of a driving device according to an embodiment of the present disclosure.

As shown in FIG. 11, compared with the first lead 21, a line width of the second lead 23 is large and an impedance is relatively small. Compared with the first signal of the first lead 21, the second signal of the second lead 23 has the opposite phase, the same voltage amplitude, and a large current. However, a driving capability of the touch drive chip 4 itself is limited, a large amount of electromagnetic interference radiation from the first lead 21 cannot be significantly weaken.

Figure 12:
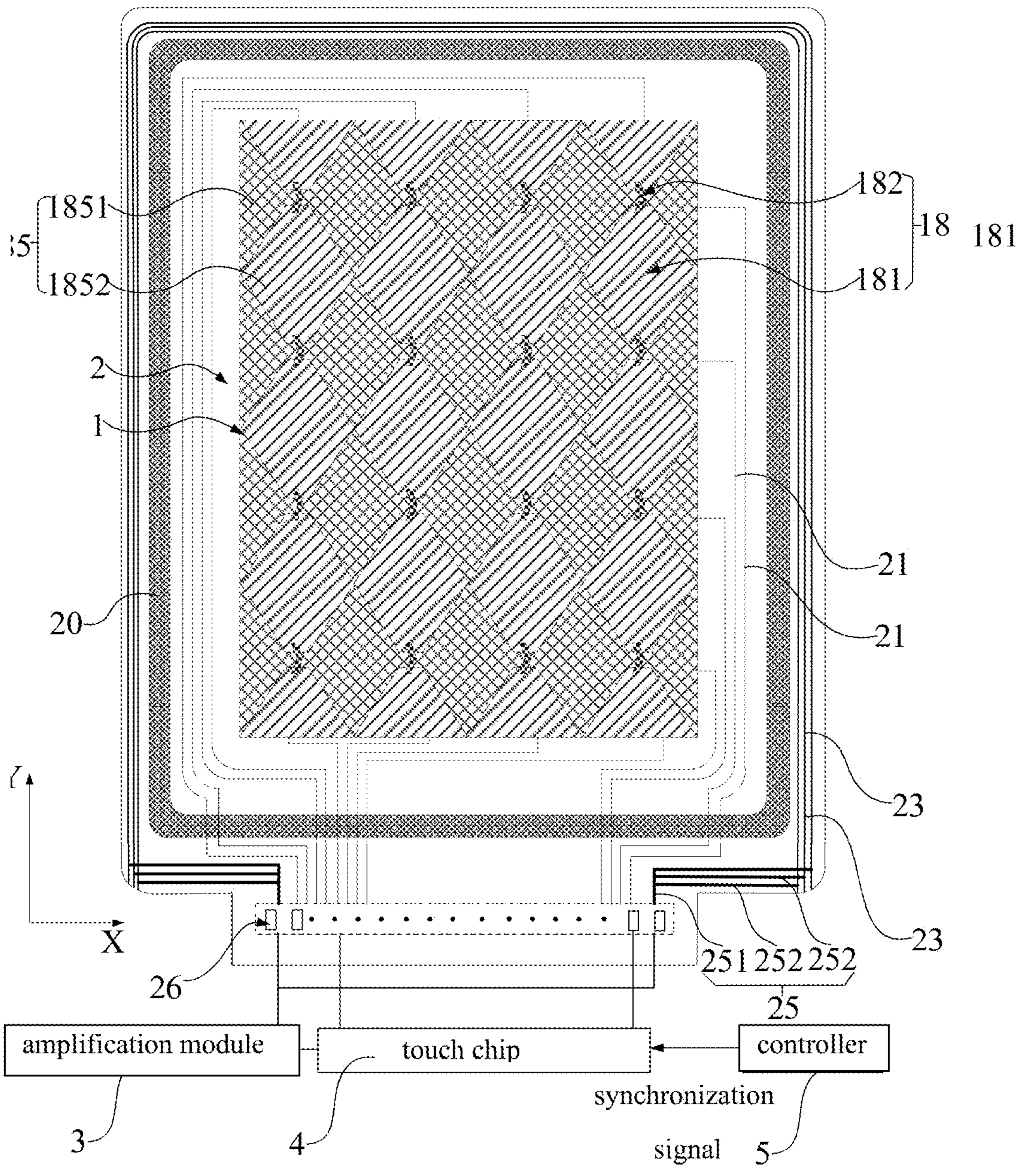
FIG. 12 is a schematic view of another driving device of the touch display module according to an embodiment of the present disclosure.

As shown in FIG. 12, the touch display module further includes a signal amplification module 3, the signal amplification module 3 is provided on the touch drive board. The amplification module is a voltage amplification module or a current amplification module, such as a voltage feedback amplifier or a current feedback amplifier.

Figure 13:
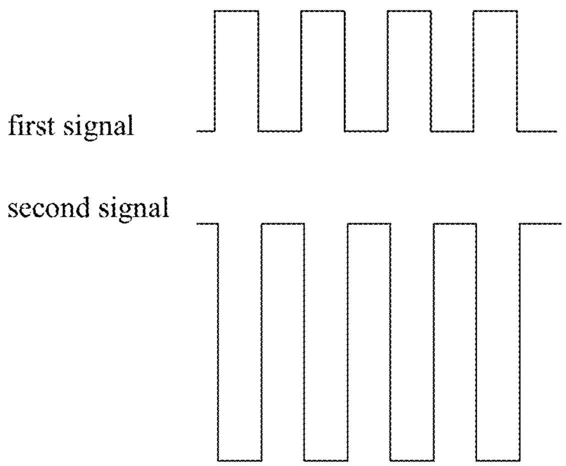
FIG. 13 is a waveform view of another driving device according to an embodiment of the present disclosure.

As shown in FIG. 13, the input end of the signal amplification module 3 is connected to the binding pin 26 of the touch drive chip 4. The input end of the signal amplification module 3 is configured to input the second signal, and the output end of the signal amplification module 3 is connected to the first lead 21. The signal amplification module 3 is configured to amplify the current or voltage of the second signal, and the second signal amplified by the signal amplification module 3 has the same frequency and is in an opposite direction as the first signal; the current or voltage of the second signal is the optimal voltage amplitude or current intensity obtained from simulation.

The signal amplification module 3 outputs the amplified second signal to the binding pin 26 of the touch display panel. The second lead 23 radiates the amplified magnetic field lines in the opposite direction, weakening the touch electromagnetic interference radiation of the touch structure of the touch display apparatus.

Figure 14:
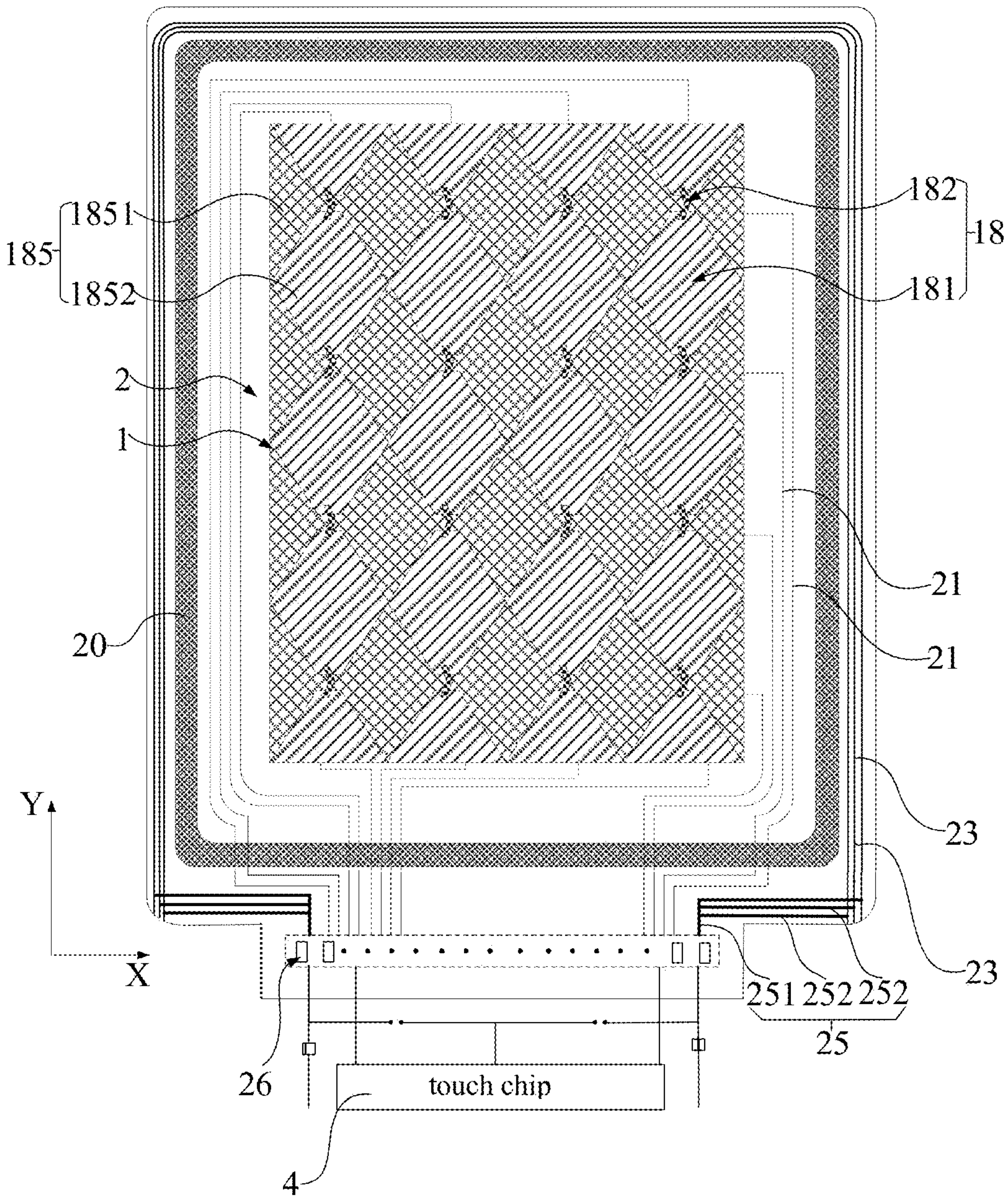
FIG. 14 is a structure schematic view of the touch display module according to an embodiment of the present disclosure when the second lead is input the second signal.
Figure 15:
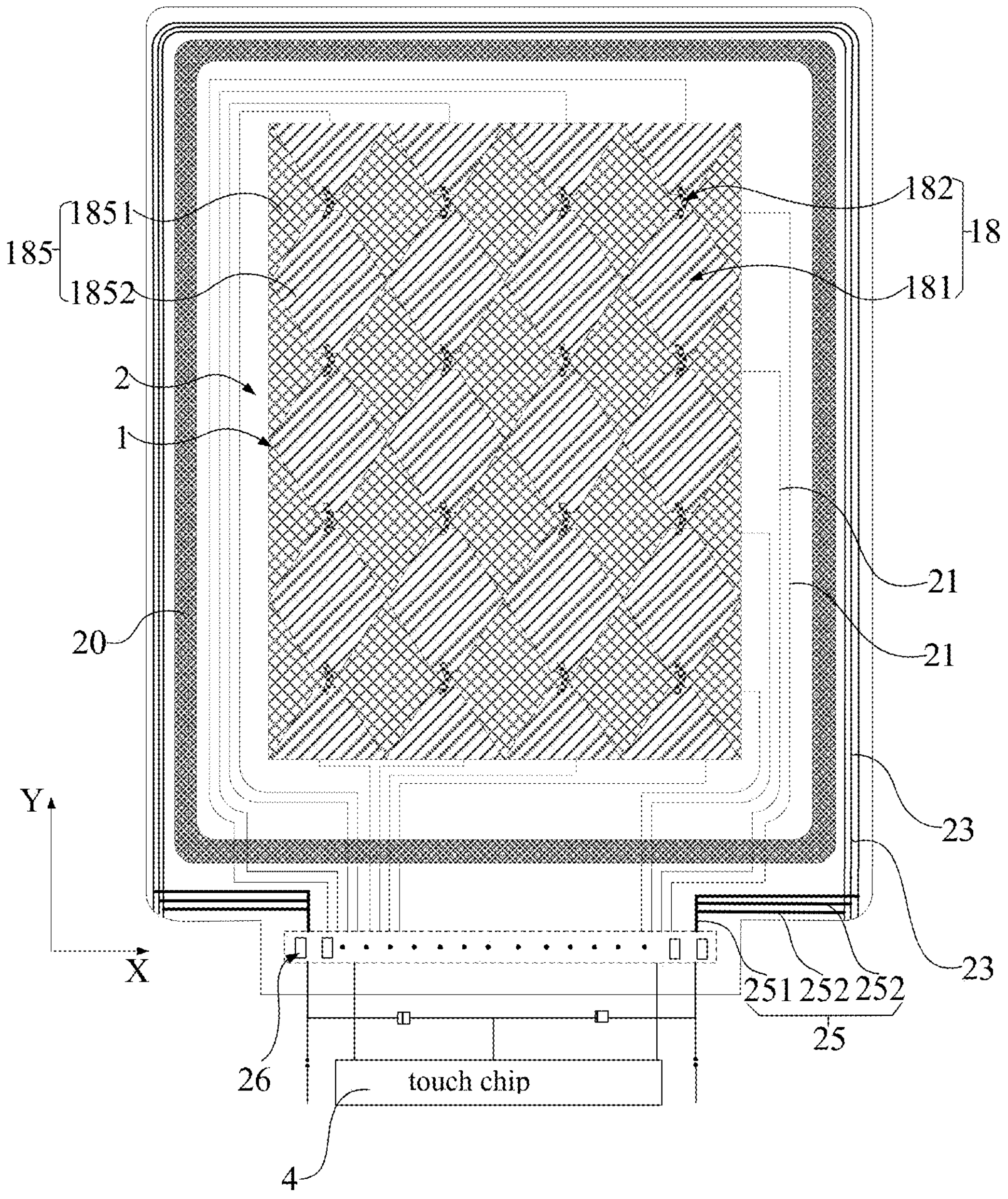
FIG. 15 is a structure schematic view of a touch display module according to an embodiment of the present disclosure when a second lead is grounded.

The first signal is emitted in the self-capacitance stage and the mutual capacitance stage. The self-capacitance stage refers to a non-touch driving period of the touch display module, while the mutual capacitance stage refers to a touch driving period of the touch display module. As shown in FIG. 14, the output end of the 0Ω resistor is always connected to the second lead 23, and the input end of the 0Ω resistor in the self-capacitance stage is connected to the ground. A reference signal is input to the second lead 23, and the voltage of the reference signal is lower than that of the second signal. As shown in FIG. 15, the input end of the 0Ω resistor in the mutual capacitance stage is connected to the touch drive chip 4. The second signal, which is a mirror image of the first signal, is input to the second lead 23 by the touch drive chip 4 to weaken the electromagnetic interference radiation generated by the first signal.

Figure 16:
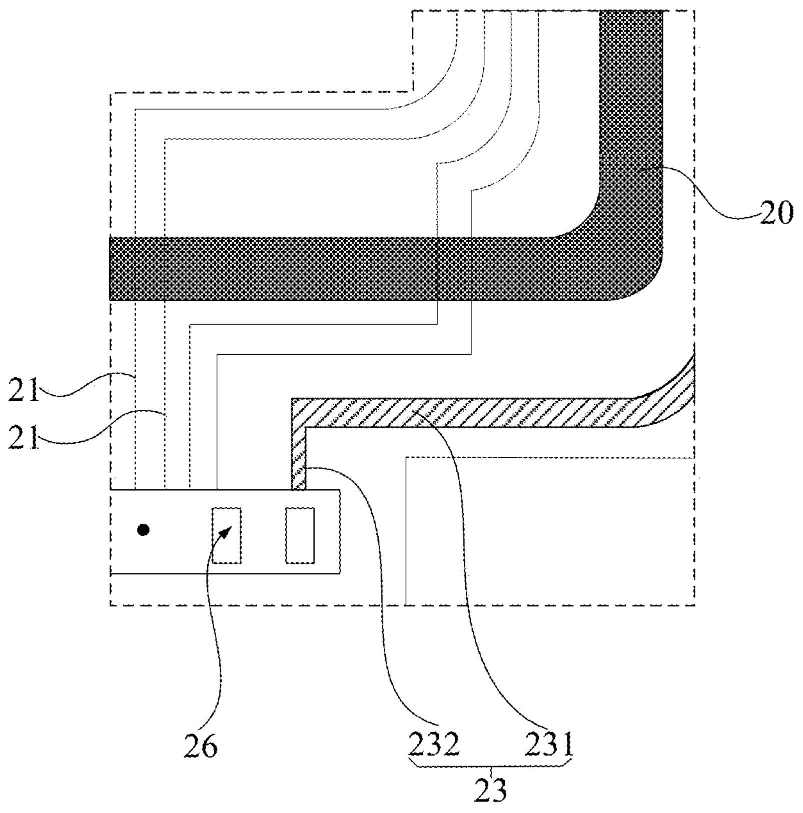
FIG. 16 is an enlarged partial view of part B in FIG. 7.

The second lead 23 has a width of 30 μm-200 μm, and it is preferred that the width of the second lead 23 is greater than or equal to 100 μm. As shown in FIG. 16, the second lead 23 includes a signal segment 231 and a binding segment 232 sequentially connected. The signal segment 231 is parallel to the dam 20, and the binding segment 232 usually intersects with an extension direction of the dam 20, or may be perpendicular to the extension direction of the dam 20. The width of signal segment 231 is greater than the width of binding segment 232. In order to facilitate the setting of sufficient binding pins 26 in the binding area, the width of the binding segment 232 is usually reduced, but this can easily lead to electrostatic discharge (ESD) problems. In order to reduce or avoid the problem of electrostatic discharge, a ratio of the width of the signal segment 231 to the width of the binding segment 232 is between 1-10. In this embodiment, the ratio of the width of the signal segment 231 to the width of the binding segment 232 may be 3 or 4.

Figure 17:
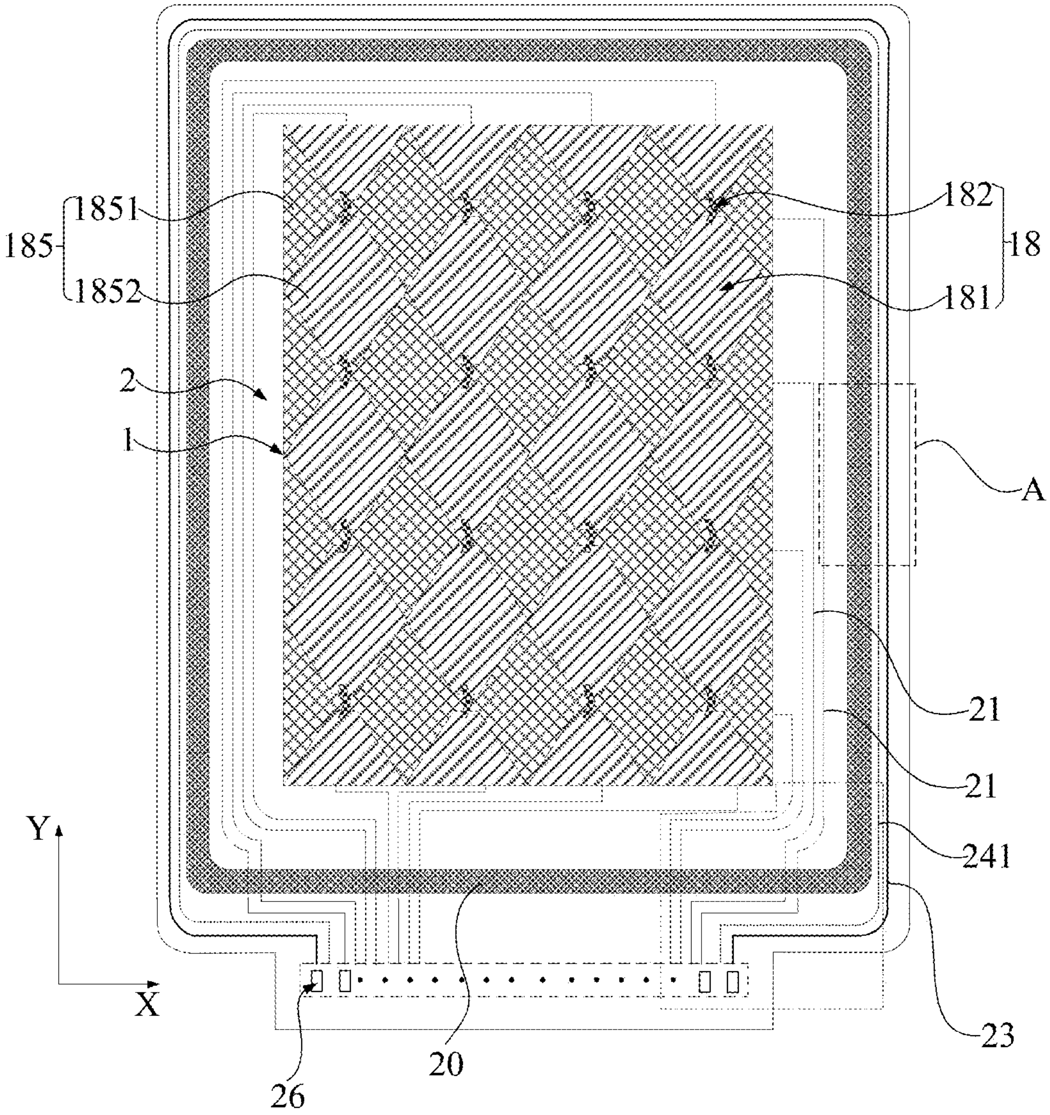
FIG. 17 is a plan schematic view of a touch display module according to an embodiment of the present disclosure being provided with a first grounding line.
Figure 18:
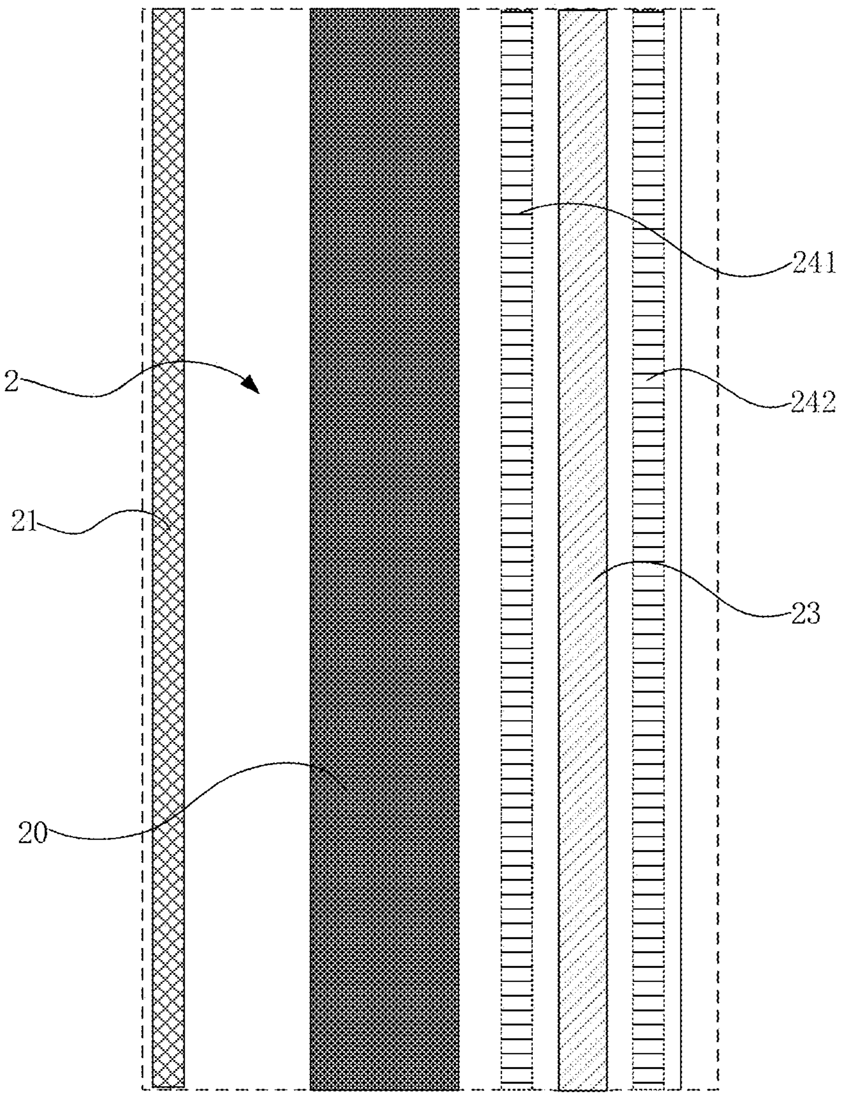
FIG. 18 is an enlarged partial view of part A in FIG. 17.

As shown in FIGS. 17 and 18, the touch display module may further include a first grounding line 241, the orthographic projection of the first grounding line 241 on the base substrate is between the orthographic projection of the second lead 23 on the base substrate and the orthographic projection of the first lead 21 on the base substrate. The first grounding line 241 is configured to input a reference signal. It should be noted that the first grounding line 241 may serve to isolate and shield external noise.

Figure 19:
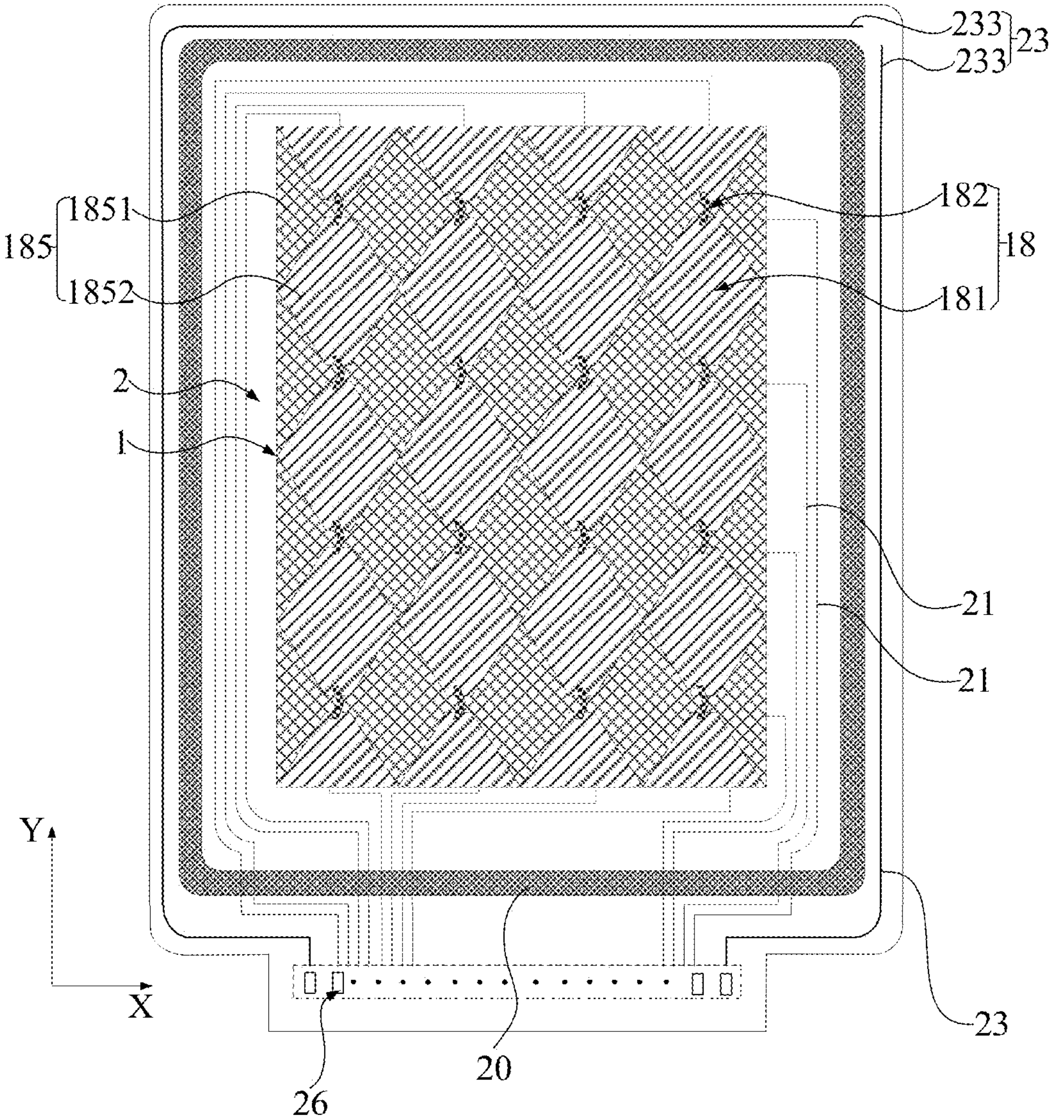
FIG. 19 is a plan schematic view of the touch display module according to an embodiment of the present disclosure when the second lead is disconnected.

As shown in FIG. 19, the signal segment 231 may be disconnected at an edge or a corner of the non-display area, and the second lead 23 may be divided into two or more second sub-lead segments 233 to avoid the bias effect caused by the formation of a loop by the second lead 23, which may interfere and affect the first lead 21.

Figure 20:
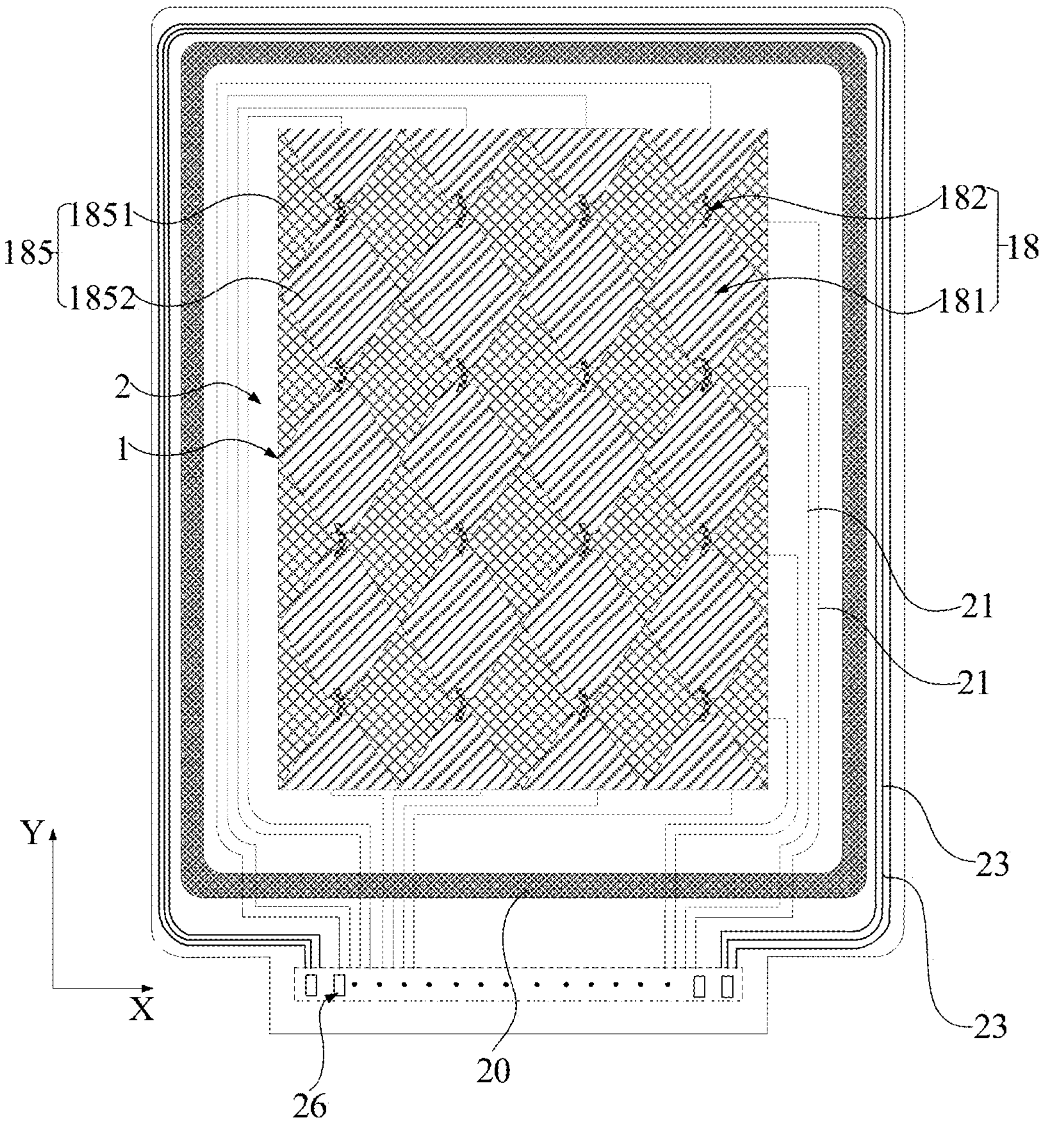
FIG. 20 is a plan schematic view of the touch display module according to an embodiment of the present disclosure when a plurality of second leads are provided outside a dam.
Figure 21:
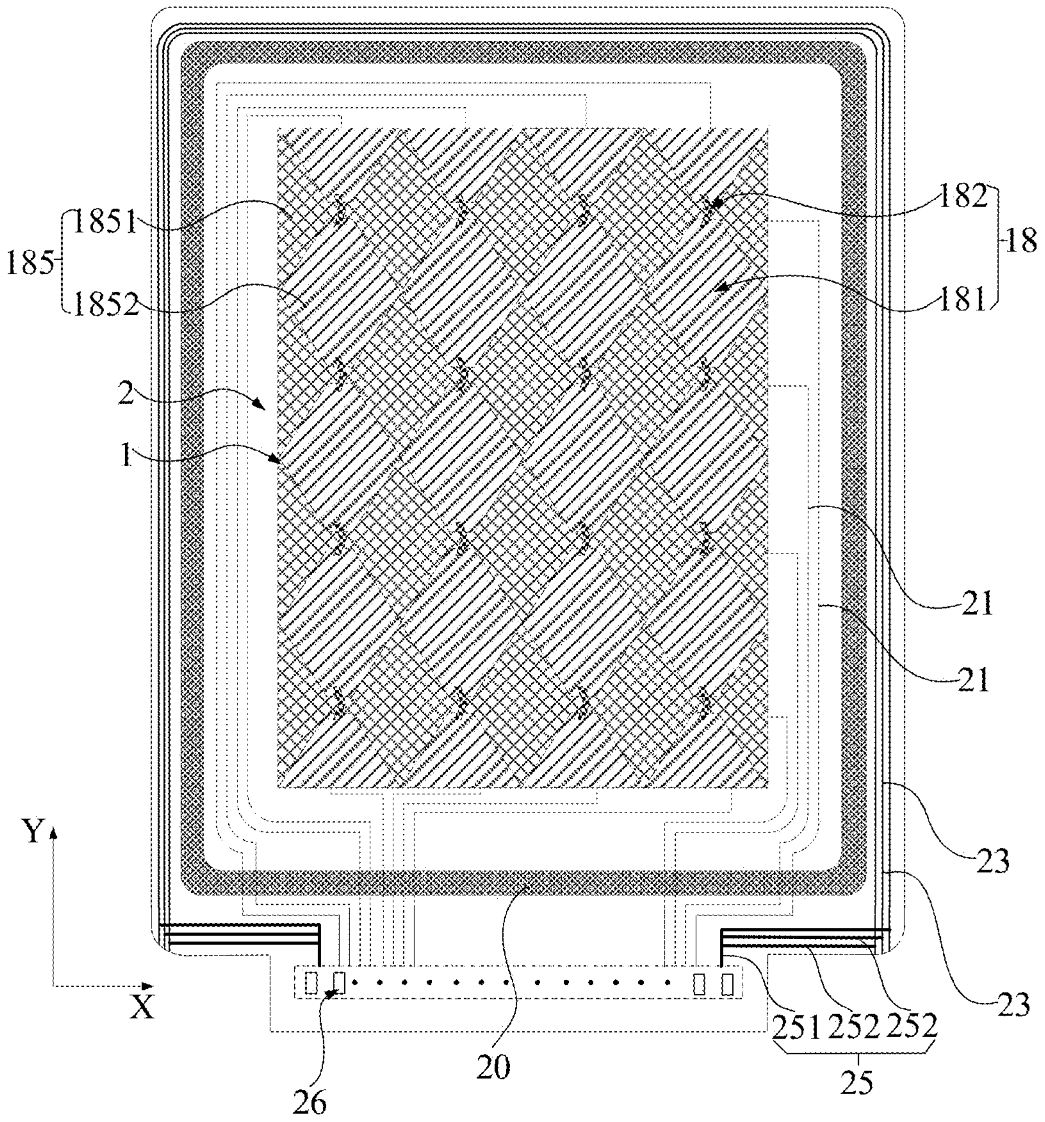
FIG. 21 is a plan schematic view of the touch display module according to an embodiment of the present disclosure when a plurality of second leads are connected to an adapter line.

As shown in FIG. 20, a number of second leads 23 is plural. As shown in FIG. 21, the touch display module further includes an adapter line 25, the adapter line 25 may include a main line segment 251 and a branch line segment 252. The main line segment 251 is provided as one, and the number of the branch line segments 252 is the same as the number of the second leads 23. One end of each branch line segment 252 is connected to the main line segment 251, and the other end thereof is respectively connected to one first lead 21 through a via hole. The branch line segment 252 close to the display area may be connected to the second lead 23 away from the display area, and the branch line segment 252 away from the display area may be connected to the second lead 23 close to the display area.

As shown in FIG. 21, in order to prevent the accumulation of static electricity in long wires, the signal segment 231 may be divided into two segments: the first sub-signal segment 2311 and the second sub-signal segment 2312. The second sub-signal segment 2312 is at both ends of the first sub-signal segment 2311, the first sub-signal segment 2311 is in the first sub-haptic control layer, the second sub-signal segment 2312 is in the second sub-haptic control layer, and the second sub-signal segment 2312 is connected to the first sub-signal segment 2311 through a via hole.

Figure 22:
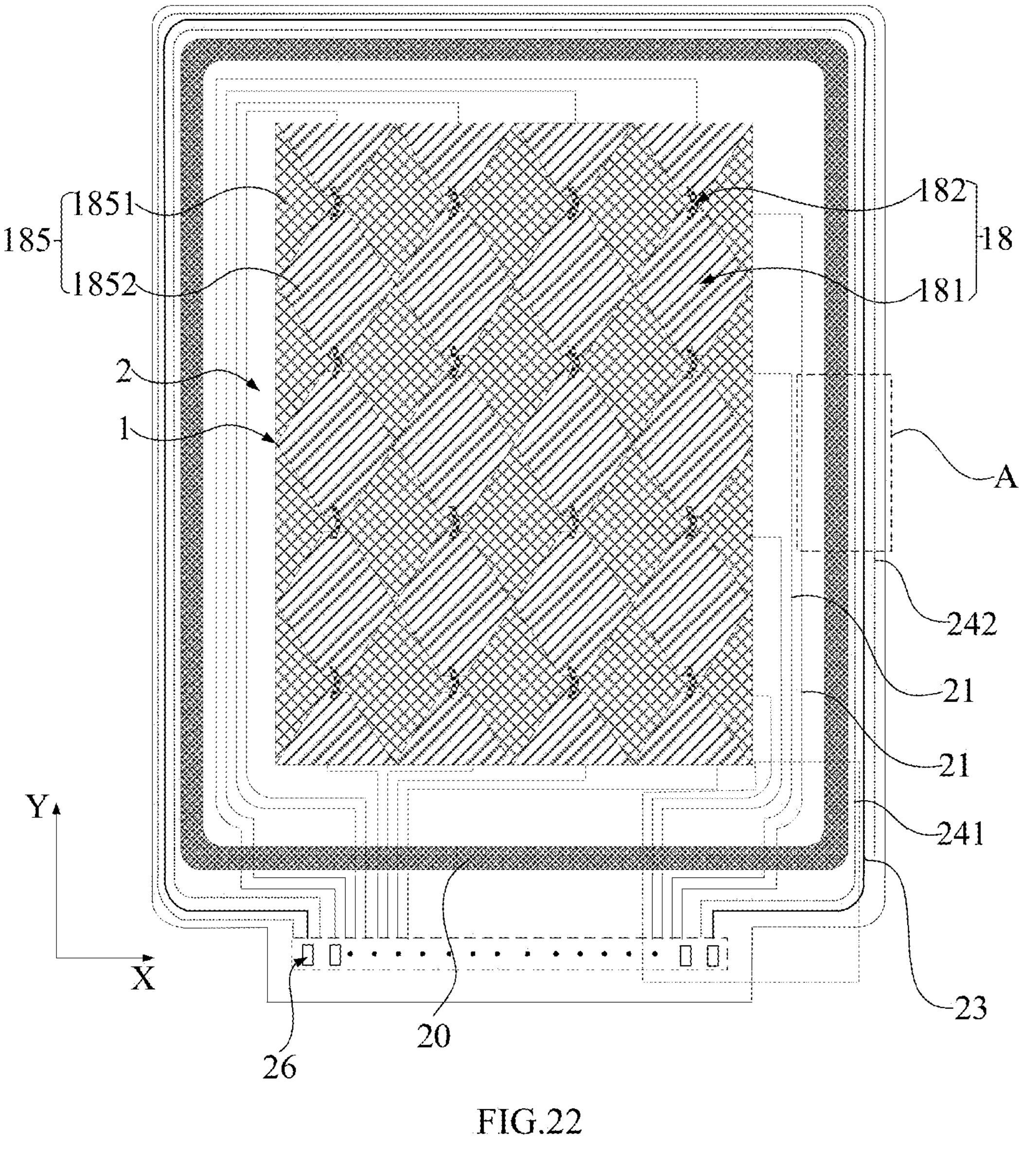
FIG. 22 is a plan schematic view of the touch display module according to an embodiment of the present disclosure being provided with a second grounding line.
Figure 23:
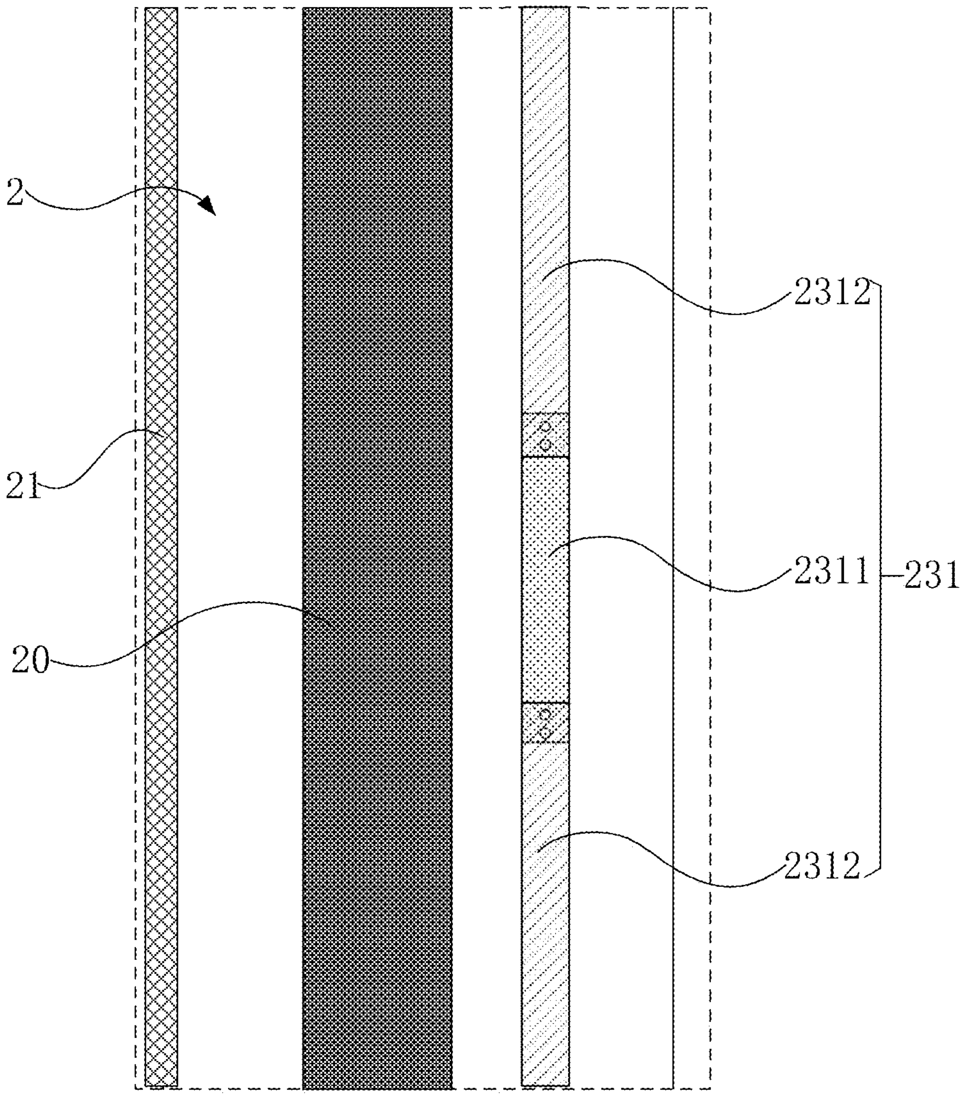
FIG. 23 is another enlarged view of part A in FIG. 7.

As shown in FIGS. 22 and 23, the touch display module further includes a second grounding line 242, an orthographic projection of the second grounding line 242 on the base substrate 10 is at a side of an orthographic projection of the second lead 23 on the base substrate 10 away from the display area 1.

In order to further reduce electromagnetic interference radiation, it is possible to consider minimizing the current magnitude of the first signal as much as possible. The current magnitude of the first signal may be calculated by using an empirical formula I=Delta Cm/Cptx/Cprx, where I represents the current of the first signal, Delta Cm represents the change in capacitance value, Cptx represents the capacitance value between the first touch electrode and the cathode, and Cprx represents the capacitance value between the second touch electrode and the cathode. It should be noted that the first touch electrode herein is the touch driving electrode, and the second touch electrode is the touch sensing electrode.

The film layer above the in-vehicle touch structure is relatively thick, including the polarizing layer, adhesive layer, and cover plate, resulting in low touch signals sensed by the touch structure. In addition, considering the need to operate the touch screen while wearing gloves, the signal volume is even lower. The in-vehicle touch display panel is relatively large, generally ranging from 13 inches to 20 inches. With the existing touch drive chip 4, there is no more channels available. In order to improve touch sensitivity, the size of the touch unit may be increased.

The increase in size of the touch unit results in an increase in the area of the first and second touch electrodes of one single touch unit, as well as an increase in the capacitance between the first touch electrode and the cathode, an increase in the capacitance between the second touch electrode and the cathode, and an increase in the RC loading of the touch unit. Therefore, it is necessary to consider reducing the area of the first and second touch electrodes to lower Cptx and Cprx. However, the decrease in the area of the first touch electrode and the second touch electrode is not conducive to increasing the change in capacitance value, ensuring the accuracy of touch control.

Figure 24:
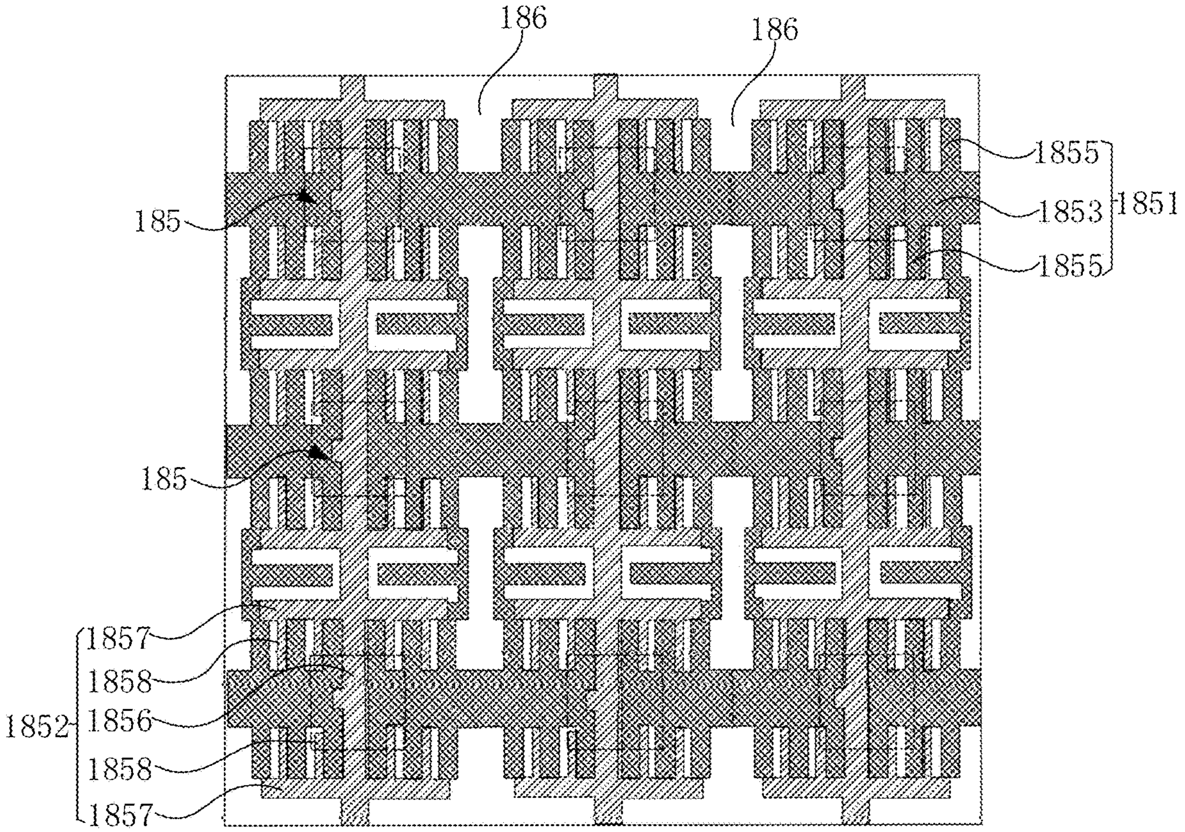
FIG. 24 is a plan schematic view of a touch unit of the touch display module according to an embodiment of the present disclosure.
Figure 25:
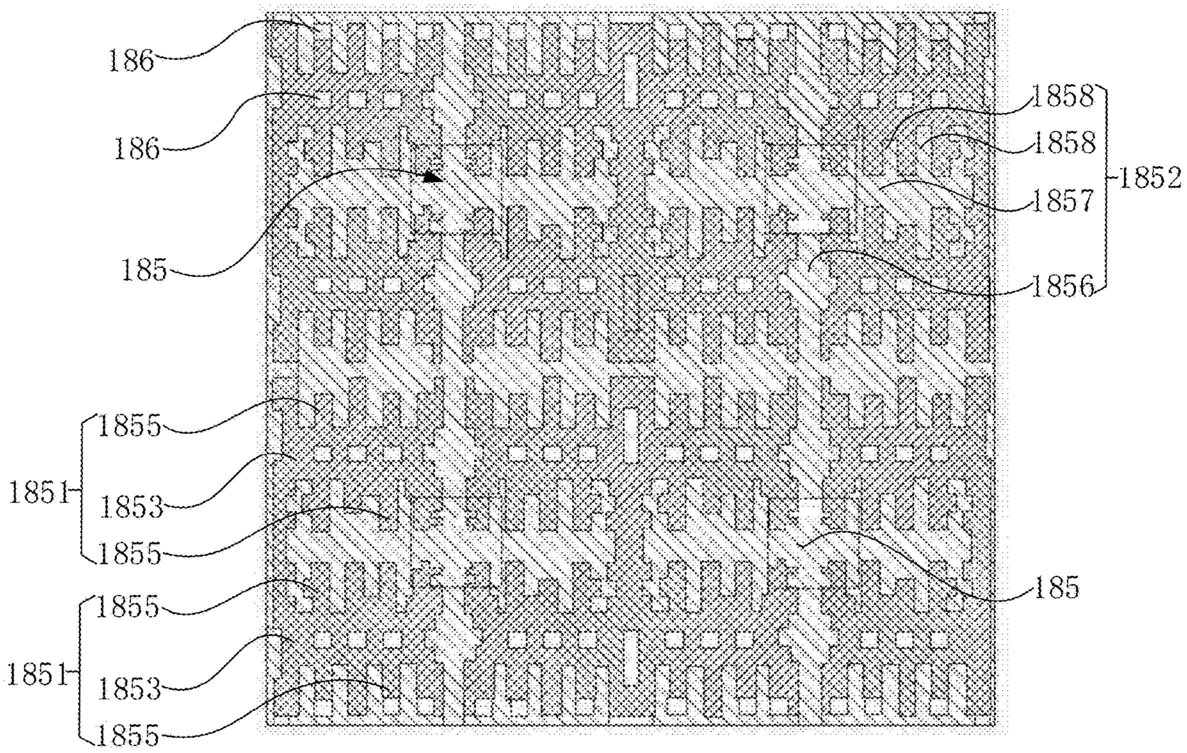
FIG. 25 is a plan schematic view of another touch unit of the touch display module according to an embodiment of the present disclosure.
Figure 26:
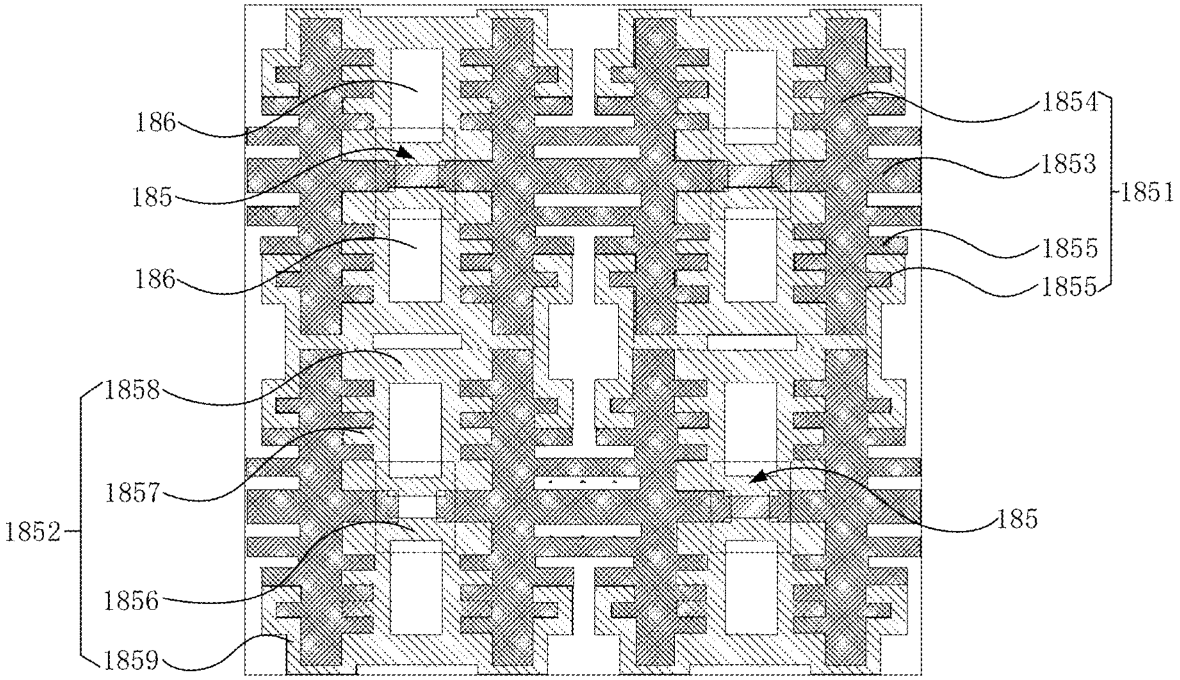
FIG. 26 is a plan schematic view of another touch unit of the touch display module according to an embodiment of the present disclosure.

Based on this, the embodiment of the present disclosure further provides a touch display module. As shown in FIGS. 24 to 26, the touch display module is applied to an in-vehicle display apparatus. The touch display module includes a base substrate, a haptic control layer, a first lead 21, and a second lead 23. The first lead 21 is provided on a side of the base substrate and located in the non-display area, the first lead 21 is configured to input a first signal; an orthographic projection of the second lead 23 on the base substrate is on a side of an orthographic projection of the first lead 21 on the base substrate away from the display area. The second lead 23 is configured to input the second signal, the second signal having a same frequency and being in an opposite direction with the first signal; the haptic control layer includes a touch unit, the touch unit includes a plurality of sub-touch units 185 arranged in an array. The sub-touch unit 185 includes a first touch electrode portion 1851 and a second touch electrode portion 1852. One of the first touch electrode portion 1851 and the second touch electrode portion 1852 is interconnected, and the other thereof is connected through a bridging layer. A plurality of first touch electrode portions 1851 on the same straight line form the first touch electrode, and a plurality of first touch electrode portions 1851 on the same straight line form the second touch electrode. The first touch electrode and the second touch electrode are respectively connected to one first lead wire 21.

The haptic control layer includes a plurality of sub-touch units 185 arranged in an array. The first touch electrode includes a plurality of first touch electrode portions 1851, and the second touch electrode includes a plurality of second touch electrode portions 1852. The uniformity of the first touch electrode and the second touch electrode is high, which can balance the changes in capacitance values, the capacitance values between the first touch electrode portion 1851 and the cathode, and the capacitance values between the second touch electrode portion 1852 and the cathode, so as to reduce the current magnitude of the first signal without greatly affecting the touch accuracy. On the basis of the above-mentioned touch display module, electromagnetic interference radiation can be further reduced.

The touch display module involved in the embodiments of this disclosure will be described with reference to specific examples.

The haptic control layer 18 may be mutual capacitance haptic control, the haptic control layer 18 includes a first sub-haptic control layer 181 and a second sub-haptic control layer 182. The first sub-haptic control layer 181 is a metal mesh layer (MM), and the second sub-haptic control layer 182 is a bridge metal layer (BM). The metal grid is in the display area and may be divided into touch driving (Tx) metal grid and touch sensing (Rx) metal grid according to the horizontal and vertical directions.

The haptic control layer 18 includes a plurality of sub-touch units 185 arranged in an array. The sub-touch unit 185 includes a first touch electrode portion 1851 and a second touch electrode portion 1852. One of the first touch electrode portion 1851 and the second touch electrode portion 1852 is interconnected, and the other thereof is connected through a bridging layer. A plurality of first touch electrode portions 1851 on the same straight line form the first touch electrode, and a plurality of first touch electrode portions 1851 on the same straight line form the second touch electrode. The first touch electrode and the second touch electrode are respectively connected to one first lead 21.

The first touch electrode portion 1851 and the second touch electrode portion 1852 are grid-shaped electrode lines, and the touch display module includes a plurality of sub-pixels. The electrode lines of the first touch electrode and the second touch electrode are between adjacent sub-pixels. The electrode lines of the first touch electrode portion 1851 and the second touch electrode portion 1852 are at the same distance from adjacent sub-pixels to prevent any impact on the light emission of the touch display module.

Each first touch electrode portion 1851 has a first main body portion 1853, and the second touch electrode portion 1852 has a second main body portion 1856. An orthographic projection of the first main body portion 1853 on the base substrate forms an overlapping position with an orthographic projection of the second main body portion 1856 on the base substrate, and the overlapping position is at a center of the sub-touch unit 185. The first touch electrode portion 1851 and the second touch electrode portion 1852 are coordinated through an interdigitated structure. The interdigitated structure includes a first interdigitated portion 1855 on the first touch electrode portion 1851 and a second interdigitated portion 1858 on the second touch electrode portion 1852. The first interdigitated portion 1855 and the second interdigitated portion 1858 are insulated on the same layer and nested with each other.

The first touch electrode portion 1851 includes the first main body portion 1853, a first connecting portion 1854, and a plurality of first interdigitated portions 1855. The first connecting portion 1854 is connected to the first main body portion 1853 and extends outward in a direction perpendicular to the first main body portion 1853. A plurality of first interdigitated portions 1855 are connected to the first connecting portion 1854 and extend outward in a direction intersecting with the first main body portion 1853. The second touch electrode portion 1852 includes the second main body portion 1856, a second connecting portion 1857, and a plurality of second interdigitated portions 1858. The second connecting portion 1857 is connected to the second main body portion 1856 and extends outward in a direction perpendicular to the second main body portion 1856. A plurality of second interdigitated portions 1858 are connected to the second connecting portion 1857 and extend outward in a direction intersecting with the second main body portion 1856. The first main body portion 1853 and the second main body portion 1856 are overlapped in a cross shape at the center of each sub-touch unit 185.

As shown in FIG. 24, the haptic control layer may include a first type of touch unit, with a size of 4.0 mm~5.5 mm. The width of the electrode lines of the first sub-haptic control layer 181 and the second sub-haptic control layer 182 are 3~4 μm, and may be divided into nine identical sub-touch units 185 by a center of the touch unit. Each sub-touch unit 185 includes the first touch electrode portion 1851, the second touch electrode portion 1852, and a bridging portion. The first touch electrode portion 1851 and the second touch electrode portion 1852 may be in the first sub-haptic control layer 181, and the bridging portion may be in the second sub-haptic control layer 182. The bridging portion includes two channels.

The first touch electrode portion 1851 includes one first main body portion 1853 arranged along the first direction and a plurality of first interdigitated portions 1855. A plurality of first interdigitated portions 1855 are respectively arranged on both sides of one first main body portion 1853. The second touch electrode portion 1852 includes one second main body portion 1856 arranged along the second direction, two second connecting portions 1857, and a plurality of second interdigitated portions 1858. The two second connecting portions 1857 are connected to one second main body portion 1856 and extend outward in a direction perpendicular to the second main body portion 1856. A plurality of second interdigitated portions 1858 are connected to the second connecting portion 1857 and extend in a direction perpendicular to the second main body portion 1856 towards the first main body portion 1853. The first interdigitated portion 1855 and the second interdigitated portion 1858 are insulated on the same layer and nested with each other. The first main body portion 1853 and the second main body portion 1856 are overlapped in a cross shape at the center of each sub-touch unit 185, with fewer transition areas 186 (dummy) at the overlapping position. The width of the transition area 186 is 60-130 μm.

As shown in FIG. 25, the haptic control layer may include a second type of touch unit, with a size of 4.0 mm~5.5 mm. The width of the electrode lines of the first sub-haptic control layer 181 and the second sub-haptic control layer 182 are 3~4 μm, which may be divided into four identical sub-touch units 185 by the center of the touch unit. The first touch electrode portion 1851 of the sub-touch unit 185 includes two first main body portions 1853 arranged in parallel along the first direction, the transition area 186 is provided on the first main body portion 1853. A plurality of first interdigitated portions 1855 are respectively provided on both sides of the two first main body portions 1853. The second touch electrode portion 1852 includes one second main body portion 1856 arranged along the second direction and one second connecting portion 1857. One second connecting portion 1857 is connected to one second main body portion 1856 and extends outward in a direction perpendicular to the second main body portion 1856. A plurality of second interdigitated portions 1858 are respectively provided on both sides of one second connecting portion 1857. The first interdigitated portion 1855 and the second interdigitated portion 1858 are insulated on the same layer and nested with each other. In order to improve the signal quality and meet the touch control requirements when wearing gloves, a small amount of transition area 186 with a width of 60-130 μm is added.

As shown in FIG. 26, the haptic control layer may be provided as a third type of touch unit, with a size of 4.0 mm~5.5 mm for the third type of touch pattern. The width of the electrode lines of the first sub-haptic control layer 181 and the second sub-haptic control layer 182 are 3~4 μm, which may be divided into four identical sub-touch units 185 by the center of the touch unit. The first touch electrode portion 1851 of the sub-touch unit 185 includes one first main body portion 1853 arranged along a first direction, one first connecting portion 1854, and a plurality of first interdigitated portions 1855. One first connecting portion 1854 is connected to one first main body portion 1853 and extends in a direction perpendicular to the first main body portion 1853. A plurality of first interdigitated portions 1855 are provided on both sides of the two first connecting portions 1854. The second touch electrode portion 1852 includes one second main body portion 1856 arranged along a second direction and two second connecting portions 1857. The two second connecting portions 1857 are connected to one second main body portion 1856 and extend in a direction perpendicular to the second main body portion 1856. A plurality of second interdigitated portions 1858 are provided on both sides of the second main body portion 1856, the first interdigitated portion 1855 and the second interdigitated portion 1858 are insulated on the same layer and nested with each other. The two ends of the second connecting portion 1857 are provided with second cooperation portions 1859, which are nested with the first interdigitated portion 1855 on the outer side of the first connecting portion 1854. The second touch electrode portion 1852 has a large transition area 186 inside, and moreover, transition areas 186 of various shapes are evenly distributed in other positions.

Comparing the first type of touch unit with the second type of touch unit, the capacitance value change of pure finger touch (Delta Cm) increased by 59.8% from 0.106 picofarads (PF) to 0.1694 picofarads, indicating that both types of touch units meet the requirements of finger touch. The capacitance value change when touch with gloves increased from 0.04 picofarads to 0.087 picofarads. When wearing gloves for touch, the second type of touch unit is better than the first type of touch unit. The capacitance of all first touch electrodes (Total Cptx) increased by 55.3% from 505.38 picofarads to 784.67 picofarads, while the capacitance of all second touch electrodes (Total Cprx) increased by 19.6% from 471.76 picofarads to 564.12 picofarads. The second type of touch unit is closer to the limit value of the touch drive chip. The resistance of the first touch electrode increased by 35.4% from 13.81 ohms (Ω) to 18.7 ohms, while the resistance of the second touch electrode increased by 36.7% from 11.63 to 15.9, indicating that the resistance of the first type of touch unit is small. The proportion of transition area 186 has significantly decreased from 36.45% to 8.4%, while the capacitance when wearing gloves for touch control has increased by 66.9% from 1.029 picofarads to 1.717 picofarads. The second type of touch unit faces a higher risk of high and low temperature dotting, and the control pressure of the touch drive chip 4 is greater.

Comparing the first type of touch unit with the third type of touch unit, the capacitance values for pure finger touch are 1.029 picofarads and 1.026 picofarads, respectively. The changes in capacitance values for pure finger touch are 0.106 picofarads and 0.082 picofarads, respectively, with little difference. All first touch electrodes increased by 32.4% from 505.38 picofarads to 668.94 picofarads, while all second touch electrodes decreased by 3.2% from 471.76 to 457.08 picofarads. The applicability of the touch drive chip for the first touch unit is wider. The resistance of the first touch electrode increased by 21.9% from 13.81 ohms to 16.83 ohms, and the resistance of the first touch electrode increased by 75.2% from 11.63 ohms to 20.38 ohms, indicating that the overall resistance of the first type of touch unit is smaller. The proportion of transition area 186 is 36.45% and 34% respectively, with little difference.

As above described, compared to second type of touch unit and third type of touch unit, the first type of touch unit is better able to balance the relationship between the changes in capacitance values, the capacitance values between the first touch electrode and the cathode, and the capacitance values between the second touch electrode and the cathode, while ensuring the touch accuracy of the in-vehicle display apparatus and reducing the increase in RC loading. The touch unit should include as many sub-touch units 185 as possible.

The embodiment of the present disclosure further provides a touch display apparatus. The touch display apparatus may include any of the touch display modules disclosed in the embodiments. The specific structure and beneficial effects of the touch display module have been described in detail above, which will not be described in detail herein.

It should be noted that in addition to the touch display module, the touch display apparatus further includes other necessary components and compositions, such as circuit boards, power cords, etc. Those skilled in the art can supplement them according to the specific use requirements of the display apparatus, which will not be described in detail herein.

The embodiment of the present disclosure further provides an electronic device comprising a touch display apparatus according to any one of the disclosed embodiments. The electronic device can be traditional electronic devices such as mobile phones, computers, televisions, and camcorders, as well as in-vehicle electronic device, which will not be elaborated herein.

Other embodiments of the present disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and embodiments be considered as exemplary only, with a true scope and spirit of the present disclosure being indicated by the following claims.

What is claimed is:

1. A touch display module, having a display area and a non-display area connected to the display area, wherein the touch display module comprises:

a base substrate;

a first lead, provided on a side of the base substrate and located in the non-display area, and being configured to input a first signal;

a second lead, an orthographic projection of the second lead on the base substrate being on a side of an orthographic projection of the first lead on the base substrate away from the display area, the second lead being configured to input a second signal, the second signal having a same frequency and being in an opposite direction with the first signal; and a first grounding line, wherein an orthographic projection of the first grounding line on the base substrate is between the orthographic projection of the second lead on the base substrate and the orthographic projection of the first lead on the base substrate, and the first grounding line is configured to input a reference signal.

2. The touch display module according to claim 1, wherein during a non-touch driving period, the second lead inputs a reference signal; or the second lead is provided adjacent to the first lead, and the second lead is parallel to the first lead.

3. The touch display module according to claim 1, wherein a dam away from the display area is provided in the non-display area, and the second lead is located on a side of the dam away from the display area or on a side of the dam close to the display area.

4. The touch display module according to claim 3, wherein the second lead comprises a signal segment and a binding segment connected in sequence, the signal segment is parallel to the dam, the binding segment is perpendicular to the dam, and a width of the signal segment is greater than a width of the binding segment.

5. The touch display module according to claim 4, wherein a ratio of the width of the signal segment to the width of the binding segment is 1-10.

6. The touch display module according to claim 1, wherein a number of second leads is plural, and the touch display module further comprises an adapter line, and the adapter line is connected to a plurality of first leads through via holes, respectively.

7. The touch display module according to claim 4, wherein the touch display module further comprises a haptic control layer, the haptic control layer comprises a first sub-haptic control layer and a second sub-haptic control layer, the first sub-haptic control layer and the second sub-haptic control layer are insulated from each other, and the second lead is provided on the same layer as at least one of the first sub-haptic control layer and the second sub-haptic control layer.

8. The touch display module according to claim 7, wherein the signal segment comprises a first sub-signal segment and second sub-signal segments at both ends of the first sub-signal segment, the first sub-signal segment is at the first sub-haptic control layer, the second sub-signal segment is located in the second sub-haptic control layer, and the second sub-signal segment is connected to the first sub-signal segment through a via hole.

9. The touch display module according to claim 1, wherein a width of the second lead is 30 um-200 um.

10. The touch display module according to claim 4, wherein the signal segment is disconnected at an edge or a corner of the non-display area.

11. The touch display module according to claim 1, wherein the non-display area further comprises a binding area, the binding area is provided with a binding pin, and the first lead and the second lead are bound to the binding pin.

12. The touch display module according to claim 1, wherein the touch display module further comprises a signal amplification module, an input end of the signal amplification module is configured to input a second signal, and the output end of the signal amplification module is connected to the first lead, and the amplification module is a voltage amplification module or a current amplification module.

13. The touch display module according to claim 1, wherein the touch display module further comprises a second grounding line, and an orthographic projection of the second grounding line on the base substrate is on the side of the orthographic projection of the second lead on the base substrate away from the display area.

14. The touch display module according to claim 7, wherein the first sub-haptic control layer comprises a first touch electrode and a second touch electrode, the first lead comprises a touch driving lead and/or a touch sensing lead, and the first touch electrode and the second touch electrode are connected to the touch driving lead and the touch sensing lead, respectively.

15. A touch display module applied to an in-vehicle display apparatus, comprising:

a base substrate;

a first lead, provided on a side of the base substrate and located in a non-display area, and being configured to input a first signal;

a second lead, an orthographic projection of the second lead on the base substrate being on a side of an orthographic projection of the first lead on the base substrate away from the display area, the second lead being configured to input a second signal, the second signal having a same frequency and being in an opposite direction with the first signal;

a haptic control layer, comprising a plurality of touch units, each of the touch units comprising sub-touch units arranged in an array, each of the sub-touch units comprising a first touch electrode portion and a second touch electrode portion, wherein one of the first touch electrode portion and the second touch electrode portion is interconnected, and the other of the first touch electrode portion and the second touch electrode portion is connected through a bridging layer, and a plurality of first touch electrode portions on a same straight line form a first touch electrode, a plurality of second touch electrode portions on a same straight line form a second touch electrode, the first touch electrode and the second touch electrode are connected to one first lead, respectively, wherein each of the first touch electrode portions is provided with a first main body portion, and the second touch electrode portion is provided with a second main body portion, an orthographic projection of the first main body portion on the base substrate forms an overlapping position with an orthographic projection of the second main body portion on the base substrate, and the overlapping position is at a center of the sub-touch unit.

16. The touch display module according to claim 15, wherein the first touch electrode portion and the second touch electrode portion are coordinated through an interdigitated structure.

17. The touch display module according to claim 16, wherein the interdigitated structure comprises a first interdigitated portion provided on the first touch electrode portion and a second interdigitated portion provided on the second touch electrode portion, the first interdigitated portion and the second interdigitated portion are insulated on the same layer and nested with each other.

18. The touch display module according to claim 15, wherein the first touch electrode portion and the second touch electrode portion have grid-shaped electrode lines, the touch display module comprises a plurality of sub-pixels, and electrode lines of the first touch electrode portion and the second touch electrode portion are provided between the adjacent sub-pixels; or the electrode lines of the first touch electrode portion and the second touch electrode portion are at a same distance from the adjacent sub-pixels.

19. A touch display apparatus, comprising the touch display module according to claim 1.

* * * * *